(12) United States Patent
Baritompa et al.

(10) Patent No.: US 10,171,742 B2
(45) Date of Patent: Jan. 1, 2019

(54) IMAGE CAPTURING APPARATUS, METHOD, AND PROGRAM WITH OPERATION STATE DETERMINATION BASED UPON ANGULAR VELOCITY DETECTION

(71) Applicant: Sony Corporation, Tokyo (JP)

(72) Inventors: Bryn Baritompa, Tokyo (JP); Hiroyuki Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/906,023

(22) PCT Filed: Aug. 25, 2014

(86) PCT No.: PCT/JP2014/072105
§ 371 (c)(1),
(2) Date: Jan. 19, 2016

(87) PCT Pub. No.: WO2015/033810
PCT Pub. Date: Mar. 12, 2015

(65) Prior Publication Data
US 2016/0156849 A1    Jun. 2, 2016

(30) Foreign Application Priority Data
Sep. 6, 2013 (JP) .................. 2013-185179

(51) Int. Cl.
*H04N 5/232* (2006.01)
*G02B 7/08* (2006.01)
(Continued)

(52) U.S. Cl.
CPC .......... *H04N 5/23296* (2013.01); *G02B 7/08* (2013.01); *G03B 5/06* (2013.01); *G03B 15/00* (2013.01);
(Continued)

(58) Field of Classification Search
CPC .......... G02B 7/08; G03B 15/00; G03B 17/00; G03B 2205/0046; G03B 2217/005; H04N 5/23258; H04N 5/23296
See application file for complete search history.

(56) References Cited

U.S. PATENT DOCUMENTS 6,630,950 B1    10/2003  Ohkawara et al.
2002/0054214 A1*  5/2002  Yoshikawa .......... G02B 27/646
                                                    348/207.99
(Continued)

FOREIGN PATENT DOCUMENTS

CN    102547230 A    7/2012
JP    2005-099014 A  4/2002
(Continued)

OTHER PUBLICATIONS

Extended European Search Report dated Mar. 14, 2017 for corresponding European Application No. 14842216.5.
(Continued)

*Primary Examiner* — Amy Hsu
(74) *Attorney, Agent, or Firm* — Michael Best & Friedrich LLP

(57) ABSTRACT

The present technology relates to an image capturing apparatus, a method, and a program for performing appropriate zoom control.

An angular velocity detection unit detects an angular velocity of movement of an image capturing apparatus. An operation determination unit determines an operation state of a user based on the angular velocities at a plurality of times. A zoom control unit performs zoom control based on the operation state. As described above, by using angular velocities at a plurality of times, it is possible to identify the operation state in more detail and to perform appropriate zoom control depending on the user's operation state. The (Continued)

present technology can be applied to a digital camera, a digital still camera, a multifunctional mobile phone and the like.

20 Claims, 27 Drawing Sheets

(51) Int. Cl.
    *G03B 5/06*     (2006.01)
    *G03B 15/00*     (2006.01)
    *G03B 17/00*     (2006.01)
    *G06K 9/78*     (2006.01)
    *H04N 5/265*     (2006.01)

(52) U.S. Cl.
    CPC ............... *G03B 17/00* (2013.01); *G06K 9/78* (2013.01); *H04N 5/23258* (2013.01); *H04N 5/265* (2013.01); *G03B 2205/0046* (2013.01); *G03B 2217/005* (2013.01)

(56) References Cited

U.S. PATENT DOCUMENTS

| | | | | |
|---|---|---|---|---|
| 2005/0195277 | A1* | 9/2005 | Yamasaki | G02B 27/017 348/61 |
| 2007/0291104 | A1* | 12/2007 | Petersen | G01S 3/7865 348/14.01 |
| 2009/0295926 | A1* | 12/2009 | Miyazaki | H04N 5/23219 348/169 |
| 2009/0324208 | A1* | 12/2009 | Asano | G02B 5/06 396/55 |
| 2010/0149378 | A1* | 6/2010 | Suzuki | H04N 5/232 348/231.99 |
| 2012/0189167 | A1* | 7/2012 | Kurata | H04N 5/145 382/107 |
| 2013/0010141 | A1* | 1/2013 | Silverbrook | G03B 29/00 348/208.4 |
| 2013/0076865 | A1* | 3/2013 | Tateno | G01B 11/03 348/46 |
| 2013/0230293 | A1* | 9/2013 | Boyle | H04N 5/2251 386/224 |
| 2013/0251356 | A1* | 9/2013 | Nakamura | G02B 27/646 396/55 |
| 2014/0072274 | A1* | 3/2014 | Nitta | H04N 9/87 386/230 |
| 2014/0267904 | A1* | 9/2014 | Saboune | G08B 6/00 348/460 |
| 2015/0084951 | A1* | 3/2015 | Boivin | H04N 5/272 345/419 |

FOREIGN PATENT DOCUMENTS

| | | |
|---|---|---|
| JP | 2005-202018 A | 7/2005 |
| JP | 2006-033513 A | 2/2006 |
| JP | 2006-091106 A | 4/2006 |
| JP | 2009-206920 A | 9/2009 |
| JP | 2011-193329 A | 8/2011 |
| JP | 2013-046149 A | 3/2013 |

OTHER PUBLICATIONS

Chinese Office Action dated Jun. 27, 2017 for corresponding Chinese Application No. 201480046802.4.
Japanese Office Action dated Oct. 25, 2018 for corresponding Japanese Application No. 2015-535429.

* cited by examiner

IMAGE CAPTURING APPARATUS, METHOD, AND PROGRAM WITH OPERATION STATE DETERMINATION BASED UPON ANGULAR VELOCITY DETECTION

TECHNICAL FIELD

The present technology relates to an image capturing apparatus, a method, and a program. In particular, the present technology relates to an image capturing apparatus, a method, and a program for performing appropriate zoom control.

BACKGROUND ART

The related art proposes a technology for detecting a panning operation by a user, and to perform zoom control in accordance with the detection result in an image capturing apparatus (see Patent Document 1, for example).

In the image capturing apparatus, the panning operation is detected based on an output from an angular velocity sensor. If the panning operation is detected, image stabilizing processing is stopped, and a panning speed is determined from an angular velocity displacement. Based on the resultant panning speed and zoom position information, zoom control is performed in a zoom out direction.

By the processing, if a user performs the panning operation in the image capturing apparatus, a target subject falls easily within a screen by zooming out, thereby improving usability of the image capturing apparatus.

Patent Document 1: Japanese Patent Application Laid-open No. 2006-33513

SUMMARY OF INVENTION

Problem to be Solved by the Invention

However, in the technology described above, a zoom magnification is just changed to a magnification determined by the very value of the determined panning speed, i.e., the very value of the angular velocity. Therefore, appropriate zoom control is impossible.

In other words, as the zoom control determined for a momentary angular velocity is performed, it is not taking into account what sort of panning operation is done.

The present technology is made in view of the situation for seeking appropriate zoom control.

Means for Solving the Problem

An image capturing apparatus according to an embodiment of the present technology includes an angular velocity detection unit configured to detect an angular velocity of movement of its own, an operation determination unit configured to determine an operation state of a user based on the angular velocity at a plurality of times, and a zoom control unit configured to perform zoom control based on the operation state.

The zoom control unit may perform the zoom control so that a zoom magnification is decreased in a case of the operation state in which the angular velocity increases with time.

The zoom control unit may perform the zoom control so that a zoom magnification is increased in a case of the operation state in which the angular velocity decreases with time.

The zoom control unit may perform the zoom control so that a zoom magnification remains constant if the operation state is changed from the state where the angular velocity decreases with time to the state where the angular velocity increases with time.

The zoom control unit may make it difficult for the operation determination unit to determine the operation state as a predetermined operation state in a case where specific zoom control is performed.

The operation determination unit may obtain a relation equation of the time and the angular velocity based on the angular velocities at the plurality of times and compare a coefficient of the obtained relation equation with a range of values that a coefficient of a relation equation determined in advance for each of a plurality of operation states can have, thereby determining the operation state.

The operation determination unit may determine the operation state by obtaining a distance between the angular velocities at the plurality of times and angular velocities at a plurality of times determined in advance for each of a plurality of operation states.

The operation determination unit may estimate an angular velocity at a future time based on the angular velocities at the plurality of times, and determine the operation state based on the angular velocity obtained by the estimation and the angular velocities at the plurality of times.

The image capturing apparatus may further include a zoom processing unit configured to cut a partial area of a captured image under control of the zoom control unit to generate a zoom image.

The image capturing apparatus may further include a display control unit configured to arrange the captured image and the zoom image for display.

The display control unit may display a frame on an area from which the zoom image is cut in the image.

The image capturing apparatus may further include a display control unit configured to arrange an image obtained by combining the images captured at the plurality of times and the zoom image for display.

The display control unit may display a frame on an area from which the zoom image is cut in the image obtained by the composition.

The image capturing apparatus may further include an object detection unit configured to detect an object from a captured image, and the zoom control unit may be configured to perform the zoom control so that a state where the object is enlarged is kept in a case where the object is detected near a center of the image.

The image capturing apparatus may further include an object detection unit configured to detect an object from the captured image, and the zoom control unit may be configured to determine a position at which the zoom image is cut from the image based on the detection result of the object.

The image capturing apparatus may further include an object detection unit configured to detect an object from a captured image, and a correction unit configured to incline a lens that collects light entered from a subject depending on the detection result of the object.

An image capturing method or a program according to an embodiment of the present technology includes the steps of detecting an angular velocity of movement of an image capturing apparatus, determining an operation state of a user that operates the image capturing apparatus based on angular velocities at a plurality of times, and performing zoom control based on the operation state.

According to an embodiment of the present technology, an angular velocity of movement of an image capturing apparatus is detected, an operation state of a user that operates the image capturing apparatus based on angular velocities at a plurality of times is determined, and zoom control based on the operation state is performed.

Effects of the Invention

According to an embodiment of the present technology, appropriate zoom control can be performed.

Effects described herein are not necessarily limited, and may be any one of the effects described herein.

MODES FOR PERFORMING THE INVENTION

Hereinafter, embodiments to which the present technology is applied will be described with reference to the drawings.

First Embodiment

<Configuration Example of Image Capturing Apparatus>

Figure 1:
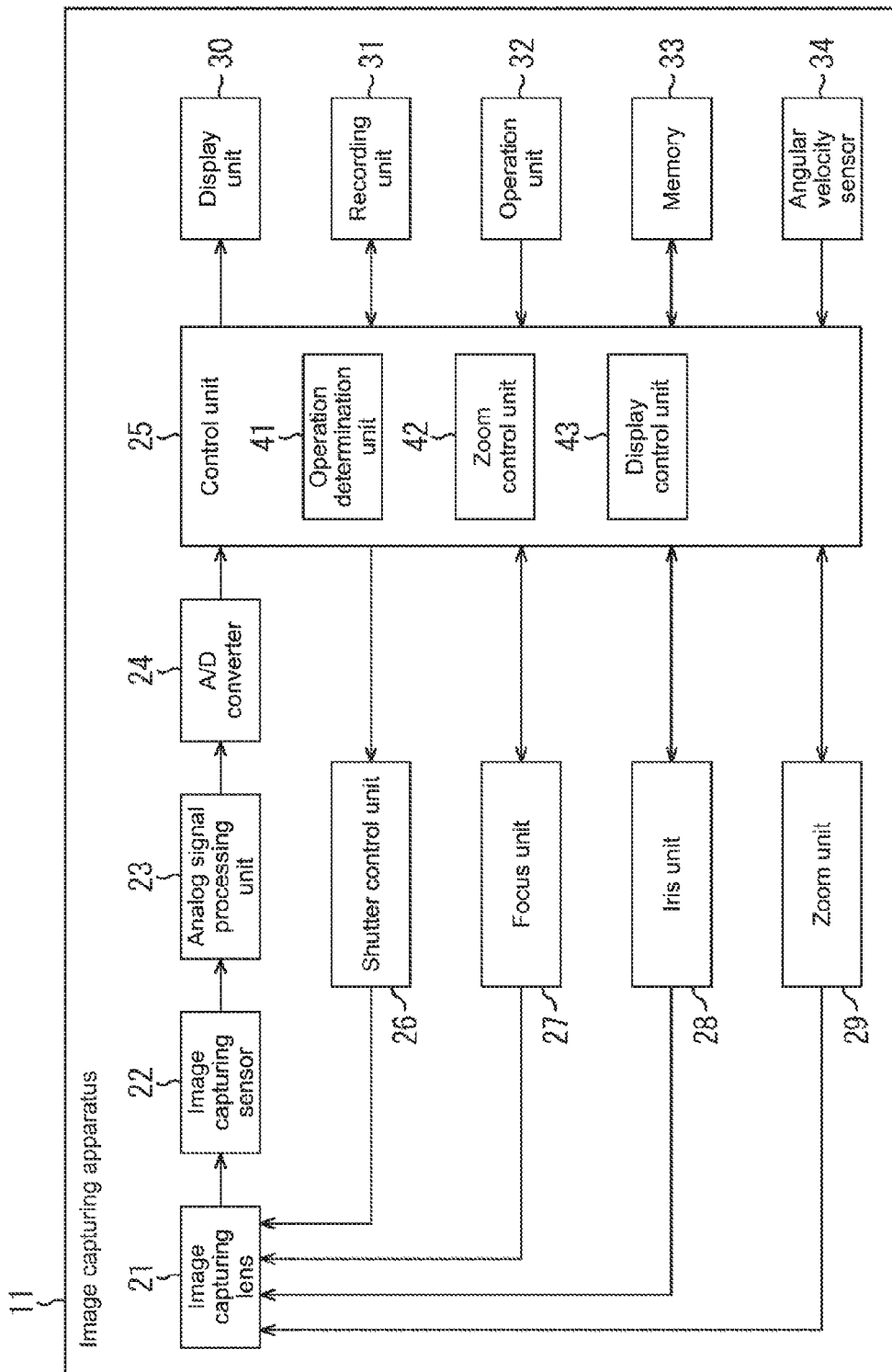
FIG. 1 A drawing showing a configuration example of an image capturing apparatus.

FIG. 1 is a drawing showing a configuration example of an image capturing apparatus to which the present technology is applied.

An image capturing apparatus 11 is, for example, a digital camera, a digital still camera, a multifunctional mobile phone and the like.

The image capturing apparatus 11 includes an image capturing lens 21, an image capturing sensor 22, an analog signal processing unit 23, an A/D (Analog/Digital) converter 24, a control unit 25, a shutter control unit 26, a focus unit 27, an iris unit 28, a zoom unit 29, a display unit 30, a recording unit 31, an operation unit 32, a memory 33, and an angular velocity sensor 34.

The image capturing lens 21 includes a plurality of lenses, a mechanical shutter, and the like, and collects light entered from a subject to form an image of the light on the receiving surface of the image capturing sensor 22. The image capturing sensor 22 includes, for example, a CCD (Charge Coupled Device). The image capturing sensor 22 receives the light entered from the image capturing lens 21, performs photoelectric conversion on the light, and supplies the resultant electrical signal to the analog signal processing unit 23.

The analog signal processing unit 23 performs various types of processing such as noise reduction on the electrical signal supplied from the image capturing sensor 22, and supplies it to the A/D converter 24. The A/D converter 24 performs A/D conversion on the electrical signal supplied from the analog signal processing unit 23 to convert the electrical signal from an analogue signal to a digital signal, and supplies it to the control unit 25. The electrical signal output from the A/D converter 24 is used as image data. It should be noted that, in more detail, a digital signal processing unit (not shown) performs gamma correction and white balance correction on the image data output from the A/D converter 24, and the resultant image data is supplied to the control unit 25.

The control unit 25 is a control circuit that comprehensively controls the whole operation of the image capturing apparatus. For example, the control unit 25 supplies the image data supplied from the A/D converter 24 to the display unit 30 to cause the display unit 30 to display the image, and supplies the image data to the recording unit 31 to cause the recording unit 31 to record it.

The control unit 25 includes an operation determination unit 41, a zoom control unit 42, and a display control unit 43. The operation determination unit 41, the zoom control unit 42, and the display control unit 43 can be achieved by the control unit 25 performing a program, for example.

The operation determination unit 41 determines, based on angular velocities at a plurality of times supplied from the angular velocity sensor 34, the user's operation with respect to the image capturing apparatus 11, such as a panning operation at a constant velocity. The zoom control unit 42 determines the zoom magnification when an image is captured depending on the determination result obtained from the operation determination unit 41. Moreover, the zoom control unit 42 performs zoom control of the image capturing lens 21 by controlling the zoom unit 29 such that the zoom magnification in the image capturing lens 21 is the determined zoom magnification or the zoom magnification determined by the user's operation with respect to the operation unit 32. The display control unit 43 controls the image display in the display unit 30.

The shutter control unit 26 performs shutter control on the image capturing lens 21 under the control by the control unit 25. The focus unit 27 drives the lens of the image capturing lens 21 under the control by the control unit 25 to perform focus control.

For example, the focus control performed on the image capturing lens 21 is based on the output from a focus sensor provided in the image capturing sensor 22 or a focus sensor (not shown) provided in the image capturing apparatus 11. Specifically, the control unit 25 determines the focus position based on the signal supplied from the focus sensor to control the focus unit 27.

The iris unit 28 drives the iris of the image capturing lens 21 under the control by the control unit 25. The zoom unit 29 moves the lens forming the image capturing lens 21 in the optical-axis direction under the control by the zoom control unit 42 so that an image is captured at the designated zoom magnification.

The display unit 30 includes, for example, a liquid crystal display element, and displays an image based on the image data supplied from the display control unit 43. The recording unit 31 is, for example, a data recording medium including an IC memory card, an internal memory, or the like, and records various data such as image data of a still image or moving image supplied from the control unit 25, and metadata of an image.

The operation unit 32 includes a touch panel, button, switch, dial, zoom button, or the like, and supplies a signal depending on the user's operation to the control unit 25.

The memory 33 is, for example, a memory including a RAM (Random Access Memory), and temporarily stores data supplied from the control unit 25. Specifically, the memory 33 is used as a temporal storage area of data processed in the control unit.

The angular velocity sensor 34 detects the angular velocity of the image capturing apparatus 11, and supplies it to the control unit 25. The angular velocity detected by the angular velocity sensor 34 is used for image stabilizing, zoom control of the image capturing lens 21, and the like. It should be noted the angular velocity sensor 34 detects not only the angular velocity that represents the movement of image capturing apparatus 11 in the horizontal direction but also the angular velocity that represents the movement of the image capturing apparatus 11 in the vertical direction.

<Regarding Zoom Control>

Next, the zoom control of the image capturing apparatus 11 will be described.

Figure 2:
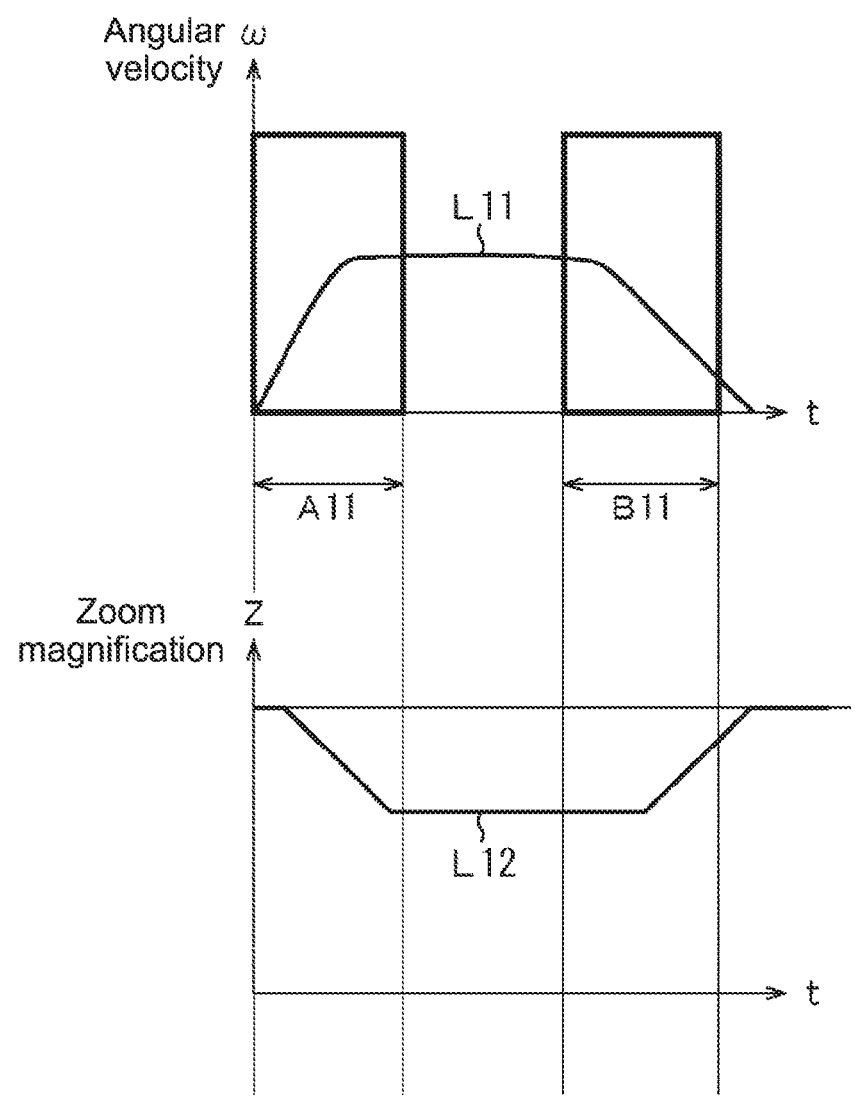
FIG. 2 A drawing for illustrating zoom control.

For example, as shown in FIG. 2, in the case where a user takes an image while moving the image capturing apparatus 11 in the horizontal direction, i.e., performing a panning operation with respect to the image capturing apparatus 11, the image capturing apparatus 11 changes the zoom magnification depending on the change in panning speed.

It should be noted that in FIG. 2, a curve L11 represents an angular velocity ω in the horizontal direction at each time t, which is detected by the angular velocity sensor 34, and a line L12 represents a zoom magnification Z of the image capturing lens 21 at each time t. In addition, in FIG. 2, the vertical line represents the angular velocity or zoom magnification and the horizontal line represents the time.

In this example, it can be seen that the user has started a panning operation at a high speed because the angular velocity ω rapidly increases with time in an interval A11 as shown by the curve L11. In the case where the user performs a panning operation at a high speed in this way, the image capturing apparatus 11 decreases the zoom magnification Z as shown by the line L12 to make it easy to grasp the whole scene. Specifically, the image capturing apparatus 11 changes the zoom magnification to the wide side to zoom out the subject.

In addition, the image capturing apparatus 11 keeps the value of the zoom magnification Z constant in the interval following the interval A11, in which the angular velocity ω is constant, i.e., in the case where the user performs a panning operation at a constant speed.

Furthermore, it can be seen that the user is trying to stop the panning operation at a high speed because the angular velocity ω rapidly decreases with time in an interval B11 as shown by the curve L11. Usually, the user stops the panning operation when a new subject is found. In view of the above, the image capturing apparatus 11 increases the zoom magnification Z with time to make it easy to watch the new subject to be observed in the case where the user stops the panning operation at a high speed as shown by the line L12. Specifically, the image capturing apparatus 11 changes the zoom magnification to the telephoto side to zoom in the subject.

As described above, according to the image capturing apparatus 11, it is possible to make the user physically feel like the image speed is slow to make it easy for the user to watch the subject by zooming out while the user performs the panning operation at a high speed. In addition, when a new subject is found, it is possible to magnify the interesting subject to make it easy for the user to watch it without causing the user to perform a zooming operation, by increasing the zoom magnification.

Figure 3:
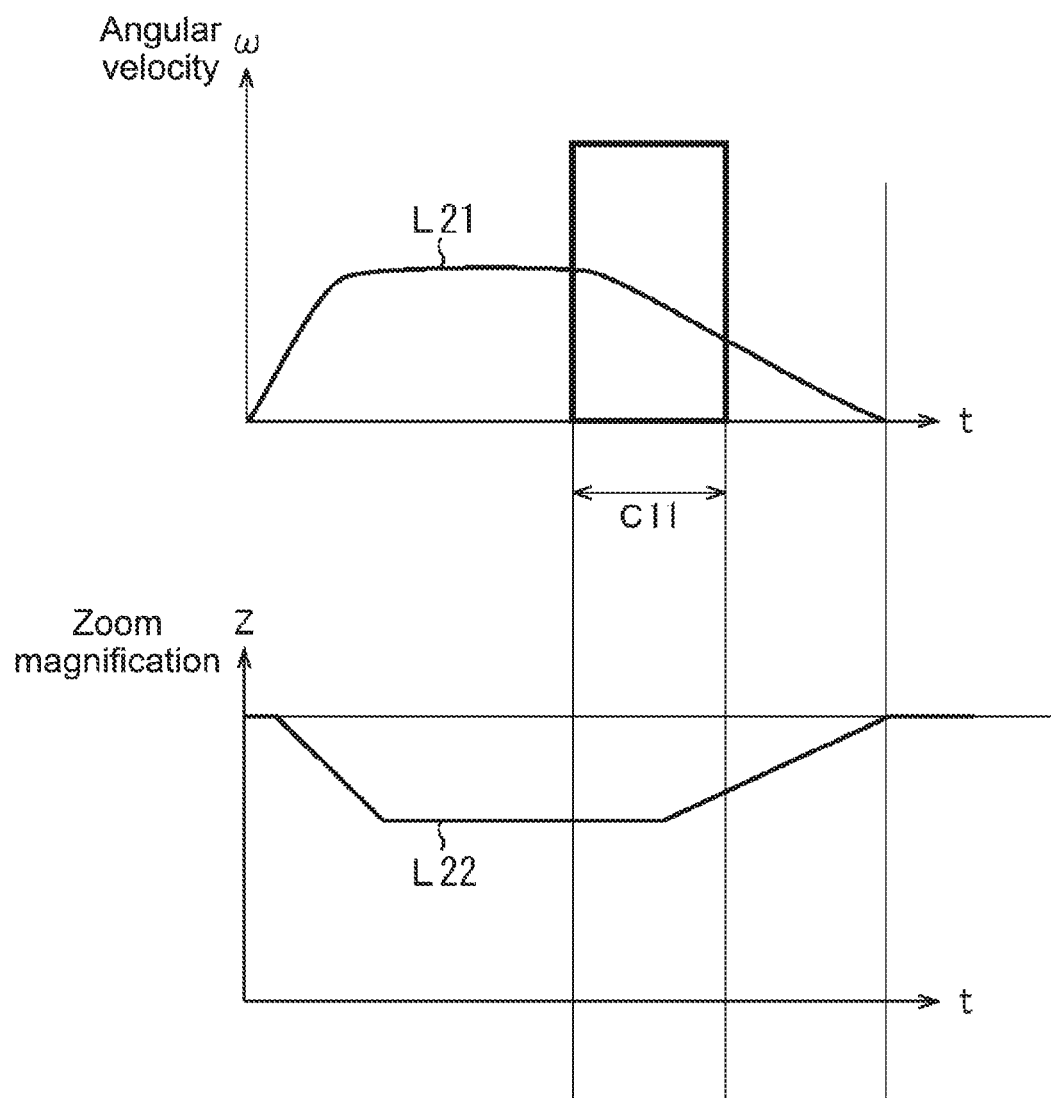
FIG. 3 A drawing for illustrating zoom control.

In addition, for example, in the case where the user takes an image while performing a panning operation and the user slowly stops the panning operation, as shown in FIG. 3, the image capturing apparatus 11 slowly changes the zoom magnification depending on the change in panning speed.

It should be noted that in FIG. 3, a curve L21 represents an angular velocity ω in the horizontal direction at each time t, which is detected by the angular velocity sensor 34, and a line L22 represents a zoom magnification Z of the image capturing lens 21 at each time t. In addition, in FIG. 3, the vertical line represents the angular velocity or zoom magnification and the horizontal line represents the time.

In this example, it can be seen that the user is trying to stop the panning operation at a slow speed because the angular velocity ω decreases with time in an interval C11 as shown by the curve L21. In view of the above, the image capturing apparatus 11 increases the zoom magnification Z so as to match the speed at which the user stops the panning operation as shown by the line L22.

In the case where the user slowly stops the panning operation in this way, the image capturing apparatus 11 can make it easy for the user to watch the interesting subject by increasing the zoom magnification so as to match the speed.

Figure 4:
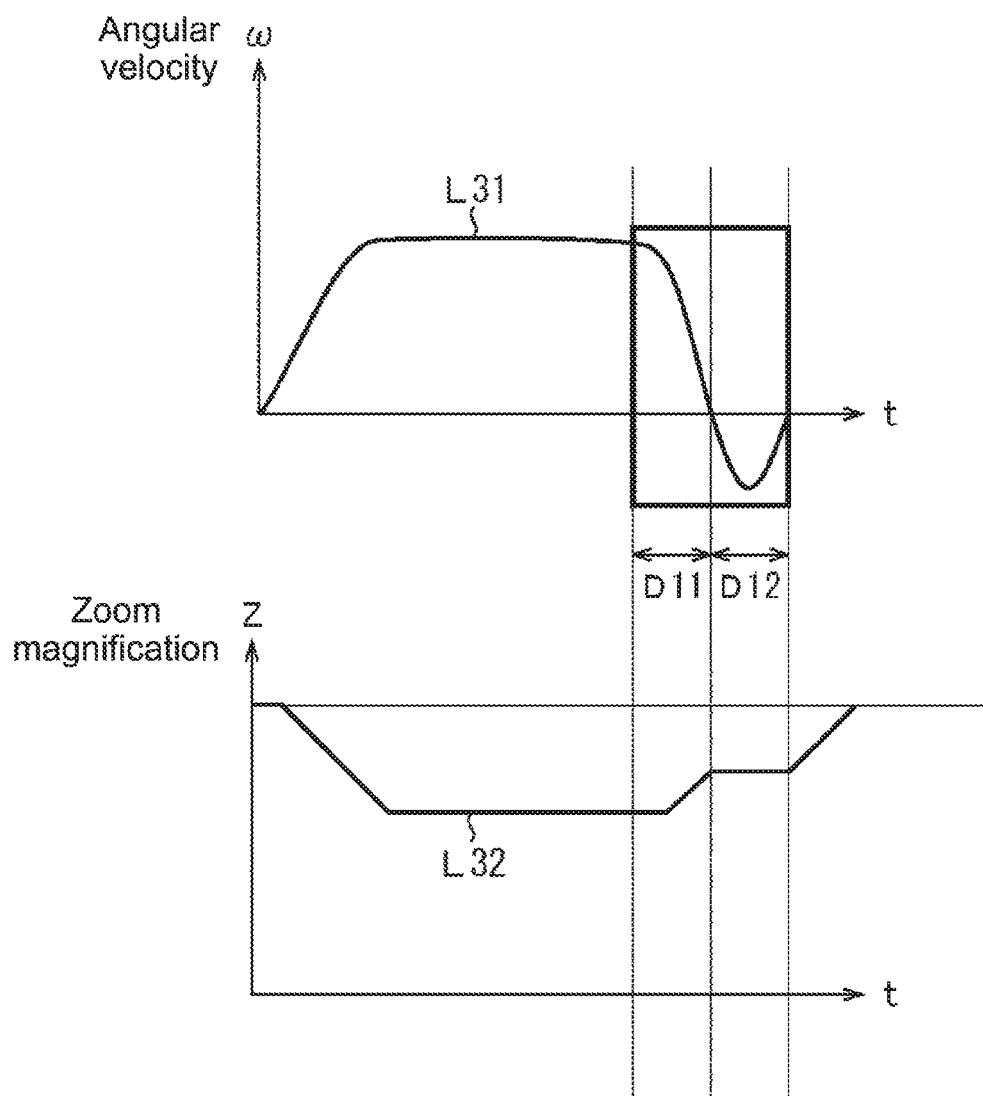
FIG. 4 A drawing for illustrating zoom control.

Furthermore, for example, in the case where the user moves the image capturing apparatus 11 a little in the direction opposite to the direction in which it has been moved because the user moves it too far while performing the panning operation as shown in FIG. 4, it is possible to make it easy for the user to watch the interesting subject by preventing the zoom magnification from being changed.

It should be noted that in FIG. 4, a curve L31 represents an angular velocity ω in the horizontal direction at each time t, which is detected by the angular velocity sensor 34, and a line L32 represents a zoom magnification Z of the image capturing lens 21 at each time t. In addition, in FIG. 4, the vertical line represents the angular velocity or zoom magnification and the horizontal line represents the time.

In this example, it can be seen that the user is trying to stop the panning operation at a high speed because the angular velocity ω rapidly decreases with time in an interval D11 as shown by the curve L31. Therefore, the image capturing apparatus 11 increases the zoom magnification Z with time in the interval D11 to make it easy for the user to watch the new subject to be observed as shown by the line L 32.

In addition, in an interval D12 following the interval D11, the value of the angular velocity ω is negative. The angular velocity ω decreases with time. Then, the angular velocity ω increases with time and the panning operation is stopped. In the interval D12, the image capturing apparatus 11 fixes the zoom magnification Z to have a constant value without change.

In the case where the movement direction of the image capturing apparatus 11 is reversed, i.e., the sign of the angular velocity ω is changed from positive to negative and then the absolute value of the angular velocity ω starts to decrease during the panning operation by the user in this way, it is regarded as overshooting, and a zoom-in operation on the new subject is stopped.

Specifically, it is highly likely that in the interval D11 and the interval D12, the user has found a new subject and has tried to stop the panning operation, but the user has stopped the image capturing apparatus 11 after moving the image capturing apparatus 11 in the direction opposite to the direction in which it has been moved because it is moved too far. In view of the above, the image capturing apparatus 11 stops the zoom-in operation for magnifying the new subject to make it easy to find the subject that has been away from the screen center because of the overrun.

As described above, according to the image capturing apparatus 11, it is possible to perform appropriate zoom control by determining the zoom magnification based on the change in angular velocity ω. It should be noted that in the following, an example in which the panning operation that moves the image capturing apparatus 11 in the horizontal direction is performed and the zoom magnification is changed depending on the panning operation will be described. However, it is needless to say that the zoom magnification can be changed depending on the movement of the image capturing apparatus 11 in the vertical direction or another direction.

Next, a specific example of a method of achieving the zoom control described above will be described.

Figure 5:
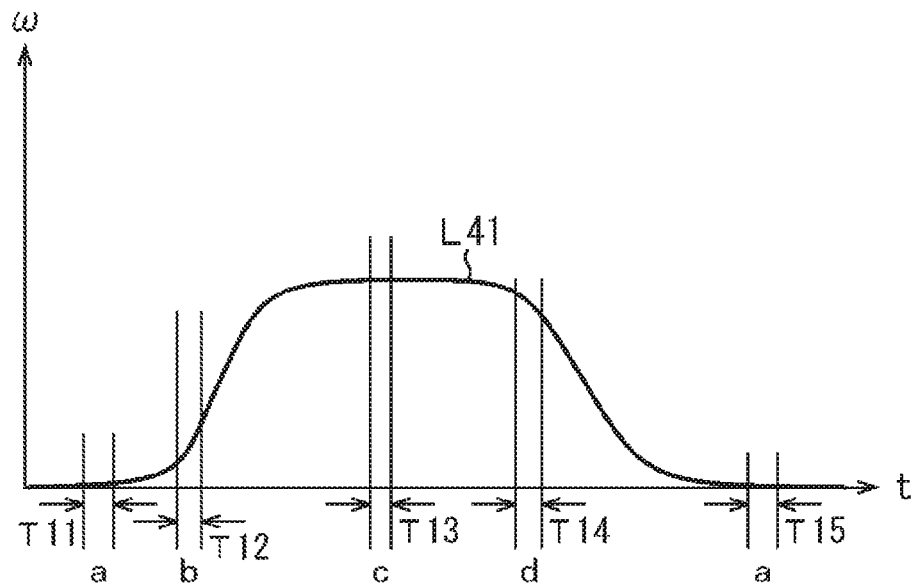
FIG. 5 A drawing for illustrating an operation state of a user.

For example, it is assumed that the user performs the panning operation as shown in FIG. 5. It should be noted that in FIG. 5, a curve L41 represents the angular velocity ω at each time t, which has been detected by the angular velocity sensor 34. In addition, in FIG. 5, the vertical line represents the angular velocity and the horizontal line represents the time.

In this example, the user starts the panning operation in the state where the image capturing apparatus 11 is not moved and stops, and then stops the panning operation, as shown by the curve L41.

The image capturing apparatus 11 classifies, based on the change in angular velocity ω, the current state of the user's panning operation into any one of an operation state a to an operation state d specified by the time change of the angular velocity ω.

For example, in the case where the panning operation is not performed and the image capturing apparatus 11 is static like the state in an interval T11 and an interval T15, i.e., where the angular velocity ω is small and remains virtually unchanged, the state of the panning operation is the operation state a.

In addition, in the case where the panning operation is started and the acceleration of the image capturing apparatus 11 is started like the state in an interval T12, i.e., where the angular velocity ω increases with time, the state of the panning operation is the operation state b. In the case where the panning operation is performed at a constant speed like the state in an interval T13, i.e., where the angular velocity ω has a somewhat large value and remains virtually unchanged, the state of the panning operation is the operation state c.

Moreover, in the case where the deceleration of the image capturing apparatus 11 is started to stop the panning operation like the state in an interval T14, i.e., the angular velocity ω decreases with time, the state of the panning operation is the operation state d.

The image capturing apparatus 11 determines the current operation state based on the angular velocities ω at a plurality of serial times detected by the angular velocity sensor 34, and selects one zoom state from some previously-determined zoom states based on the determined operation state. Then, the image capturing apparatus 11 changes the zoom magnification of the image capturing lens 21 based on the selected zoom state.

Figure 6:
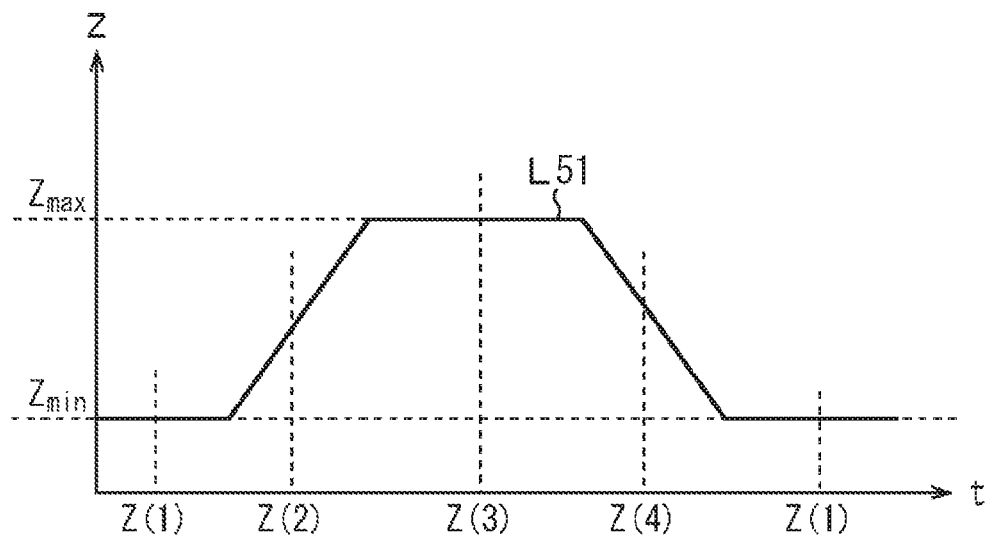
FIG. 6 A drawing for illustrating a zoom state.

For example, as the zoom state, a zoom state Z(1) to a zoom state Z(4) are determined in advance. In each zoom state, the zoom magnification is controlled as shown in FIG. 6. It should be noted that in FIG. 6, a curve L51 represents the zoom magnification Z at each time t. In addition, in FIG. 6, the vertical line represents the zoom magnification Z and the horizontal line represents the time.

In this example, under the zoom control in the zoom state Z(1), the zoom magnification Z is set to $Z_{min}$. Here, the zoom magnification $Z_{min}$ is the minimum value of the zoom magnification Z that the image capturing apparatus 11 can have when performing automatic zoom control. It should be noted that the zoom magnification $Z_{min}$ is not necessarily the minimum value of the zoom magnification Z that the image capturing lens 21 can have, i.e., the zoom magnification at the wide end.

In the case where the zoom state is the zoom state Z(1), i.e., the panning operation is performed at a constant speed and the operation state is the operation state c, for example, the zoom magnification remains to be the constant zoom magnification $Z_{min}$.

In addition, under the control in the zoom state Z(2), the zoom magnification Z is increased from $Z_{min}$ from $Z_{max}$ with time at a constant speed. Here, the zoom magnification $Z_{max}$ is the maximum value of the zoom magnification Z that the image capturing apparatus 11 can have when performing automatic zoom control. It should be noted that the zoom magnification $Z_{max}$ is not necessarily the maximum value of the zoom magnification Z that the image capturing lens 21 can have, i.e., the zoom magnification at the tele-end.

In the case where the zoom state is the zoom state Z(2), i.e., the user is trying to stop the panning operation and the operation state is the operation state d, for example, the zoom control is performed such that the zoom magnification Z increases with time.

Under the zoom control in the zoom state Z(3), the zoom magnification Z is set to $Z_{max}$. In the case where the zoom state is the zoom state Z(3), i.e., the image capturing apparatus 11 is static and the operation state is the operation state a, for example, the zoom magnification Z remains to be the constant zoom magnification $Z_{max}$.

In addition, under the zoom control in the zoom state Z(4), the zoom magnification Z is decreased from $Z_{max}$ to $Z_{min}$ with time at a constant speed. In the case where the zoom state is the zoom state Z(4), i.e., the user starts the panning operation and the operation state is the operation state b, for example, the zoom control is performed such that the zoom magnification Z decreases with time.

<Illustration for Image Capturing Processing>

Next, the operation of the image capturing apparatus 11 will be described.

When the user turns on the power source switch of the image capturing apparatus 11, which serves as the operation unit 32, the image capturing apparatus 11 starts image capturing processing and captures an image such as a moving image to display or record the obtained image. In the following, the image capturing processing performed by the image capturing apparatus 11 will be described with reference to the flow chart of FIG. 7. It should be noted that the image capturing processing is repeatedly performed until the user turns off the power source of the image capturing apparatus 11 or instructs to finish the image capturing, for example.

In Step S11, the control unit 25 turns on the power source of the image capturing apparatus 11 to supply electricity from a power source (not shown) to the respective units of the image capturing apparatus 11.

In Step S12, the image capturing apparatus 11 starts image capturing.

Specifically, the image capturing lens 21 forms an image of the light entered from the subject on the receiving surface of the image capturing sensor 22, and the image capturing sensor 22 receives the light entered from the image capturing lens 21, performs photoelectrical conversion on the light, and supplies the resultant electrical signal to the analog signal processing unit 23.

The analog signal processing unit 23 performs various types of processing such as noise reduction on the electrical signal supplied from the image capturing sensor 22, and supplies it to the A/D converter 24. The A/D converter 24 performs A/D conversion on the electrical signal supplied from the analog signal processing unit 23, and supplies it to the control unit 25. The electrical signal output from the A/D converter 24 is image data of the captured image.

The image capturing lens 21 to the A/D converter 24 continuously perform processing in which the subject is captured to generate image data and the image data is supplied to the control unit 25.

In addition, the angular velocity sensor 34 starts the detection of the angular velocity ω of the movement of the image capturing apparatus 11 in the horizontal direction, and supplies the detected angular velocity ω at each time to the control unit 25 in series.

In Step S13, the control unit 25 obtains the angular velocity ω from the angular velocity sensor 34, and supplies it to the memory 33.

In Step S14, the memory 33 stores the angular velocity ω supplied from the control unit 25. Then, in Step S15, the control unit 25 controls the memory 33 to delete the angular velocity that proceeds by n velocities therefrom out of the angular velocity ω at each time stored in the memory 33. Accordingly, N angular velocities ω at the most recent times are stored in the memory 33.

In Step S16, the operation determination unit 41 refers to the angular velocities ω at the most recent N times stored in the memory 33, and compares the N angular velocities ω with the database stored in the recording unit 31 to determine the user's operation.

Figure 8:
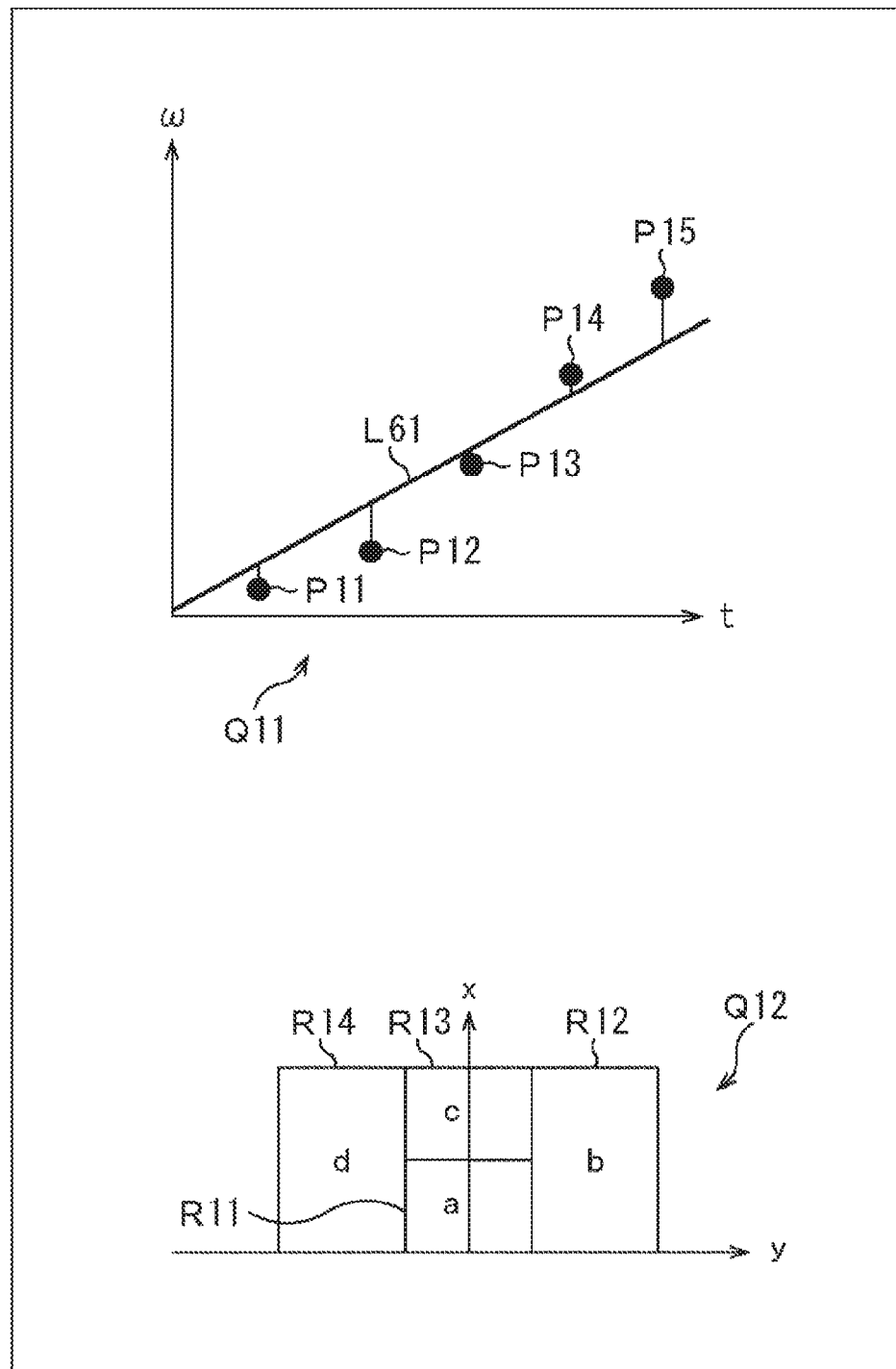
FIG. 8 A drawing for illustrating determination of operation state.

For example, It is assumed that values shown in FIG. 8 are obtained as the N angular velocities ω at the most recent N times.

It is assumed that N equals to 5 and angular velocities shown by points P11 to P15 are obtained as the angular velocities ω as shown by an arrow Q11 in FIG. 8. It should be noted that in the figure shown by the arrow Q11, the vertical axis represents the angular velocity and the horizontal axis represents the time.

The operation determination unit 41 obtains a linear equation of the angular velocity ω and the time t shown by the following formula (1), based on the values of the angular velocities ω at the times t which are shown by the 5 points P11 to P15.

[Mathematical 1]

$$\omega = x + yt \qquad (1)$$

Specifically, in the estimation of the relation equation shown by the formula (1), an efficient x and an efficient y in the formula (1) are obtained.

In this example, a straight line L61 represents the estimating equation of the angular velocity ω at each time obtained from the points P11 to P15, i.e., the linear equation shown by the formula (1).

In addition, with respect to each of the operation state a to the operation state d, the recording unit 31 records, as the database, ideal values of the coefficient x and the coefficient y in the operation state, in more detail, the range that the coefficient x and the coefficient y can have.

The operation determination unit 41 determines which of the operation state a to the operation state d the user's operation at the current time is in, by comparing the coefficient x and the coefficient y obtained from the N angular velocities ω with the coefficient x and the coefficient y for each operation state, which serve as the database and are recorded in the recording unit 31.

For example, it is assumed that the area defined by the range of the values that the coefficient x and the coefficient y recorded as the database can have is the area shown by an arrow Q12. It should be noted that in the figure shown by the arrow Q12, the vertical axis represents the coefficient x and the horizontal axis represents the coefficient y.

In this example, areas R11 to R14 on the xy space represents areas defined by the database of the operation state a to the operation state d, respectively.

For example, the R11 is an area that represents the range of values that the coefficient x and the coefficient y in the operation state a can have. Because the image capturing apparatus 11 is static in the operation state a, the angular velocity ω is small and the variation of the angular velocity ω in the time direction is supposed to be small. Therefore, the area R11 corresponding to the operation state a is an area in which the coefficient x and the coefficient y, i.e., the slope and the intercept in the estimating equation, have small values.

The operation determination unit 41 determines the user's operation state based on which of the areas R11 to R14 the coordinate (position) on the xy space defined by the coefficient x and the coefficient y obtained from the N angular velocities ω is in. For example, in the case where the position on the xy space defined by the obtained coefficients x and y is in the area R11, the user's operation at the current time is assumed to be in the operation state a.

It should be noted that in the case where the position on the xy space defined by the obtained coefficients x and y is not in any of the areas R11 to R14, the user's operation state is unknown. In addition, by adjusting the position or size of the areas R11 to R14 as necessary, it is possible to weight each operation state to make it easy to select a specific operation state or make it difficult to select a specific operation state.

Figure 9:
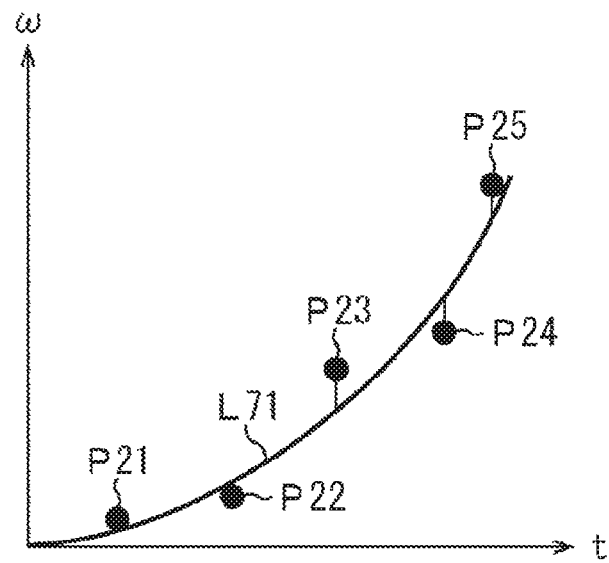
FIG. 9 A drawing for illustrating determination of operation state.

Furthermore, in FIG. 8, an example in which a linear equation is used to obtain the user's operation state has been described. However, a polynomial equation may be used to obtain the user's operation state as shown in FIG. 9, for example. It should be noted that in FIG. 9, the vertical axis represents the angular velocity and the horizontal axis represents the time.

In this example, N equals to 5 and angular velocities shown by points P21 to P25 are obtained as the angular velocities ω. The operation determination unit 41 obtains a relation equation of the angular velocity ω and the time t shown by the following formula (2), based on the values of the angular velocities ω at the times t which are shown by the 5 points P21 to P25.

[Mathematical 2]

$$\omega = x + yt + zt^2 + \ldots \quad (2)$$

Specifically, in the estimation of the relation equation shown by the formula (2), coefficients x, y, z . . . in the formula (2) are obtained.

In this example, a curve L71 represents the estimating equation of the angular velocity ω at each time, which has been obtained from the points P21 to P25, i.e., the polynomial equation shown by the formula (2).

In addition, with respect to each of the operation state a to the operation state d, the recording unit 31 records, as the database, ideal values of the coefficient x, the coefficient y, the coefficient z . . . in the operation state, in more detail, the range of the values that each coefficient in the polynomial equation can have.

The operation determination unit 41 determines the user's operation state based on which of the areas defined by the range of the values that the coefficients in the polynomial equation for each operation state, which serve as the database, can have the coordinate (position) on the space defined by the values of the coefficient x, the coefficient y, the coefficient z, and the like in the polynomial equation obtained from the N angular velocities 6 is in.

Specifically, in this example, the user's operation state is obtained by the same processing as that in FIG. 8. For example, if the polynomial equation shown by the formula (2) is a quadratic equation, which area of the areas defined by the range of the values that the coefficients x to z, which serve as the database, can have the coordinate on the xyz space defined by the coefficients x to z obtained from the actually-detected angular velocity ω is in is specified.

It should be noted that also in this case, by adjusting the position or size of the area defined by the range of values that each coefficient in the polynomial equation can have, as necessary, it is possible to weight each operation state to make it easy to select a specific operation state or make it difficult to select a specific operation state.

Furthermore, it may be possible to make the recording unit 31 record N angular velocities ω serving as the database to determine the user's operation state based on the difference between the N angular velocities ω for each operation state and the actually-detected N angular velocities ω.

Figure 10:
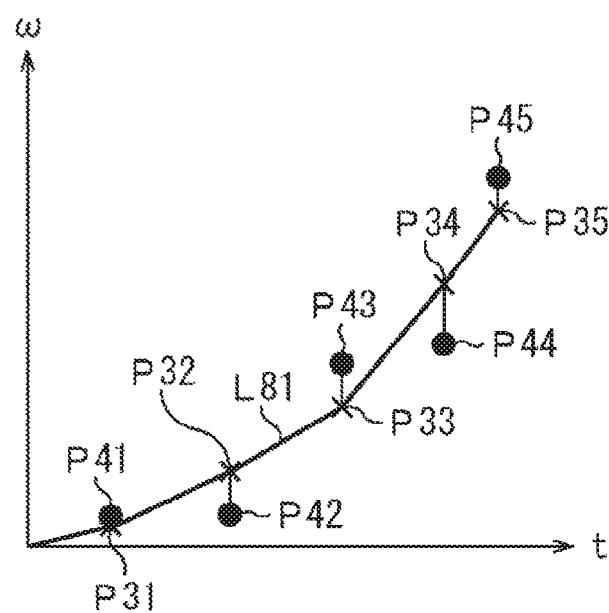
FIG. 10 A drawing for illustrating determination of operation state.

In such a case, for example, the angular velocities ω at N times are stored for the operation state a to the operation state d as the database, as shown in FIG. 10. It should be noted that in FIG. 10, the vertical axis represents the angular velocity and the horizontal axis represent the time.

In this example, N equals to 5, 5 angular velocities ω shown by 5 points P31 to P35 are recorded as the database of one operation state, and a line L81 represents the relationship between the angular velocities ω at each time obtained from the points P31 to P35 and the time t. In addition, it is assumed that the angular velocities shown by points P41 to P45 are obtained as the actual angular velocity ω at each time.

In this case, the operation determination unit 41 performs calculation shown by the following formula (3) to obtain a distance $d_x$ between the database of the operation state and the actually-detected angular velocity ω for each operation state.

[Mathematical 3]

$$d_x = \sqrt{\frac{\sum_{1}^{n}(\omega_n - \omega_{n,x})^2}{n}} \quad (3)$$

It should be noted that in the formula (3), $\omega_n$ and $\omega_{n,x}$ represent the actually-detected angular velocity ω and the angular velocity recorded as the database, respectively. In addition, n in the $\omega_{n,x}$ represents the index of time, and x represents the index for identifying the database. Therefore, in the formula (3), the square sum of the difference between the actually-detected angular velocity ω at the corresponding time and the angular velocity recorded as the database is the distance $d_x$ between the detected angular velocity and the database.

When the distance $d_x$ is obtained for each database, i.e., for each operation state, the operation determination unit 41 determines whether or not the obtained distance $d_x$ is not more than a predetermined threshold value th. Then, the operation determination unit 41 regards, as the user's operation state at the current time, the operation state of the database for which the smallest distance $d_x$ out of the distances $d_x$ that are less than the threshold value th is obtained. On the other hand, in the case where the distance $d_x$ is not less than the threshold value th, the operation state at the current time is regarded as unknown.

Also in this example, by determining the threshold value th for each database and adjusting each threshold value th as necessary, it is possible to weight each operation state to make it easy to select a specific operation state or make it difficult to select a specific operation state.

It should be noted that in the case where the distance $d_x$ is obtained for each operation state, the operation state of the database for which the smallest distance $d_x$ out of the obtained distances $d_x$ is obtained may be regarded as the user's operation state at the current time.

Figure 7:
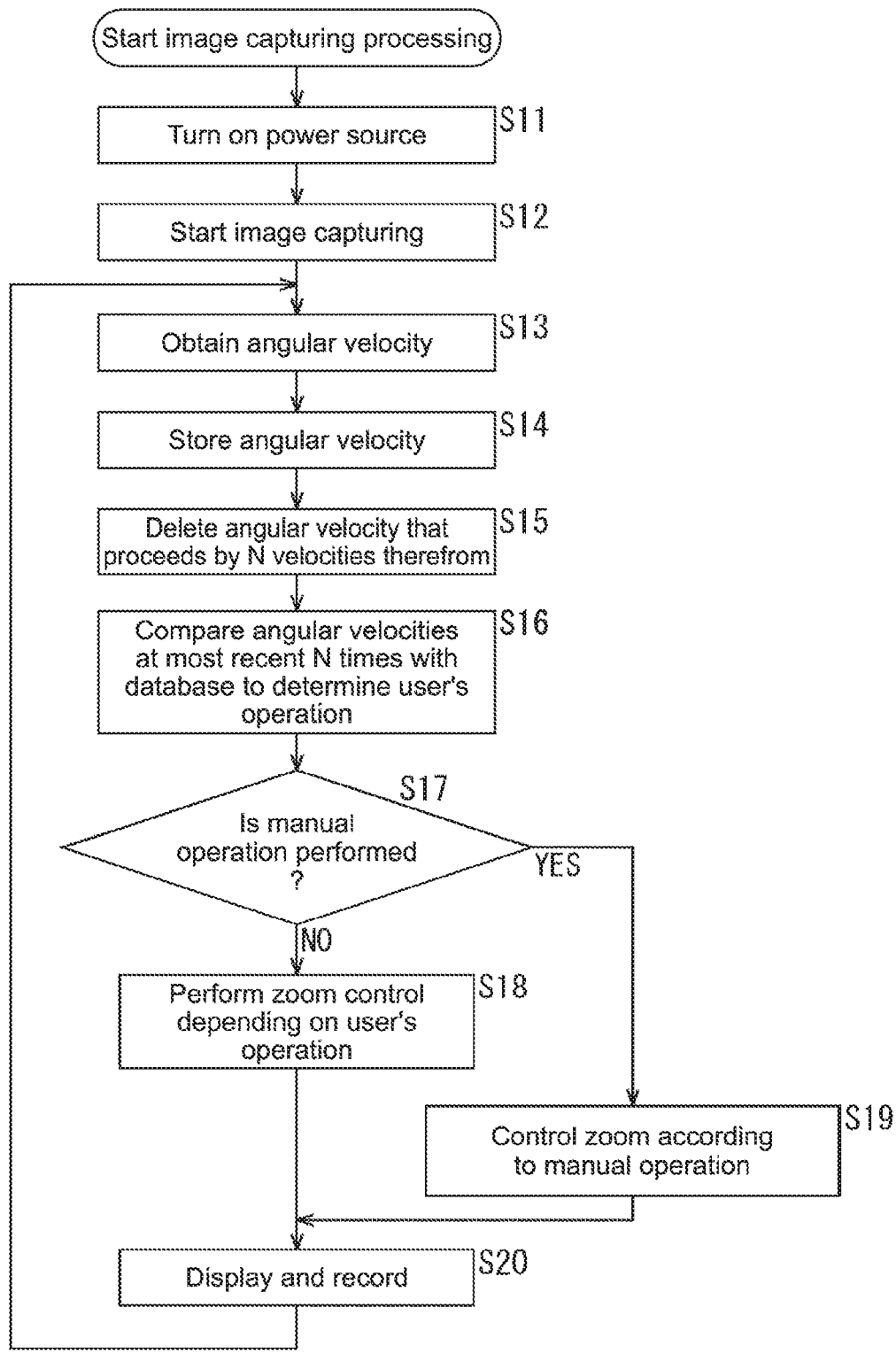
FIG. 7 A flow chart for illustrating image capturing processing.

Returning to the flow chart of FIG. 7, if the user's operation state at the current time is determined in Step S16, then, the processing proceeds to Step S17.

In Step S17, the control unit 25 determines whether or not the manual zooming operation for the image capturing lens 21, i.e., the manual operation by the user is performed, based on the signal from the operation unit 32.

For example, in the case where the user operates the zooming button serving as the operation unit 32 to perform the zoom control and the signal depending on the user's operation is supplied from the operation unit 32 to the control unit 25, it is determined that the manual operation is performed.

In Step S17, in the case where it is determined that the manual operation is not performed, the processing proceeds to Step S18.

In Step S18, the zoom control unit 42 performs the zoom control depending on the user's operation state at the current time.

Specifically, the zoom control unit 42 determines an appropriate zoom state based on the operation state determined in the process of Step S16, and determines an appropriate zoom magnification based on the zoom state and the zoom magnification at the current time. Furthermore, the zoom control unit 42 controls the zoom unit 29 based on the determined zoom magnification to change the zoom magnification Z of the image capturing lens 21. Specifically, the zoom control unit 42 moves the lens forming the image capturing lens 21 in the optical axis direction such that the zoom magnification of the image capturing lens 21 is set to the determined zoom magnification.

Accordingly, based on the user's operation state, appropriate zoom control is performed. In Step S18, if the zoom control is performed, then, the processing proceeds to Step S20.

On the other hand, in the case where it is determined that the manual operation is performed in Step S17, the zoom control unit 42 controls zoom according to the manual operation in Step S19. Specifically, the zoom control unit 42 controls the zoom unit 29 in accordance with the signal supplied from the operation unit 32 to change the zoom magnification of the image capturing lens 21.

In Step S19, if the zoom control is performed according to the user's operation, then, the processing proceeds to Step S20.

In Step S18 or Step S19, if the zoom control is performed, then, the control unit 25 displays and records an image based on the image data supplied from the A/D converter 24 in Step S20.

Specifically, the display control unit 43 of the control unit 25 supplies the image data to the display unit 30 to display the image, and supplies the image data to the recording unit 31 to record it. It should be noted that only one of the displaying and recording of the image may be performed.

If the displaying and recording of the image is performed in Step S20, then, the processing returns to Step S13, and the above-mentioned processing is repeatedly performed until the termination of the image capturing processing is instructed.

In this way, the image capturing apparatus 11 determines the user's operation state based on the angular velocities at the plurality of times, and performs zoom control depending on the operation state.

As described above, by using the angular velocities at the plurality of times, it is possible to identify the operation state in more detail, e.g., the speed of the panning operation is decelerated. Accordingly, it is possible to perform appropriate zoom control depending on the user's operation state, and to improve the usability of the image capturing apparatus 11.

<Illustration for Zoom State Determining Processing>

In addition, during the image capturing processing, zoom state determining processing in which an appropriate zoom state is determined based on the user's operation state is also performed. For example, the zoom state determining processing is performed by invoking a program when the processing of Step S18 is performed at each time.

In the following, the zoom state determining processing in which the zoom state at each time is determined in Step S18 in FIG. 7 will be described with reference to the flow chart of FIG. 11. The zoom state determining processing is performed by the image capturing apparatus 11, and is finished at the same time when the image capturing processing is finished.

In Step S51, the zoom control unit 42 initializes the user's operation state and the zoom state. Specifically, the user's operation state is set to the operation state a, and zoom state is set to the zoom state Z. Specifically, in the initial state, the panning operation is not performed, the image capturing apparatus 11 is static, and the zoom magnification Z is $Z_{max}$, for example.

In Step S52, the zoom control unit 42 determines whether or not the user's operation state obtained by the determination process of Step S16 in FIG. 7 is the operation state b.

In Step S52, in the case where it is determined that the operation state is not the operation state b, i.e., the panning operation is not started, the processing returns to Step S52 and the determination processing is repeatedly performed until it is determined that the operation state is the operation state b.

In contrast, in the case where it is determined that the operation state is the operation state b in Step S52, i.e., the panning operation is started, the zoom control unit 42 sets the zoom state to the zoom state Z(4) in Step S53. Specifically, the zoom magnification is determined so that the zoom magnification decreases with time until the zoom magnification Z becomes $Z_{min}$.

For example, in the case where the zoom state is the zoom state Z(4), a zoom magnification that is less than the present zoom magnification Z by a predetermined amount is set as a new zoom magnification, and zoom control is performed in Step S18 in FIG. 7.

In Step S54, the zoom control unit 42 determines whether or not the user's operation state obtained by the determination processing of Step S16 in FIG. 7 is the operation state d.

In the case where it is determined that the operation state is the operation state d in Step S54, the processing proceeds to Step S58.

On the other hand, it is determined that the operation state is not the operation state d in Step S54, the zoom control unit 42 weights the operation state d to prevent the zoom state from transiting from the zoom state Z(4) to the zoom state Z(2), and the processing proceeds to Step S55.

For example, in the case where the operation state is determined by the method described with reference to FIG. 8 or FIG. 9, the zoom control unit 42 makes it difficult for the operation state to be the operation state d by adjusting the position and size of the area corresponding to the operation state d such as the area R14 in FIG. 8. In addition, in the case where the operation state is determined by the method described with reference to FIG. 10, for example, the zoom control unit 42 makes it difficult for the operation state to be the operation state d by decreasing the threshold value th of the operation state d.

The zoom control unit 42 determines whether or not the zoom magnification Z is the zoom magnification $Z_{min}$ in Step S55.

In the case where it is determined that the zoom magnification Z is not the zoom magnification $Z_{min}$ in Step S55, the processing returns to Step S54 and the above-mentioned processing is repeatedly performed.

Specifically, in the case where the zoom state is the zoom state Z(4), zoom control is performed such that the zoom magnification Z is decreased by a predetermined amount with time until the zoom magnification Z becomes the zoom magnification $Z_{min}$.

On the other hand, in the case where it is determined that the zoom magnification Z is the zoom magnification $Z_{min}$ in Step S55, the zoom control unit 42 sets the zoom state to the zoom state Z(1) in Step S56. Accordingly, for example, while the user performs the panning operation at a constant speed, the zoom magnification of the image capturing lens 21 remains to be the zoom magnification $Z_{min}$, i.e., on the wide side.

The zoom control unit 42 determines whether or not the user's operation obtained by the determination of Step S16 in FIG. 7 is the operation state d in Step S57.

In the case where it is determined that the operation state is not the operation state d in Step S57, i.e., the panning operation is successively performed at a constant speed, the processing returns to Step S57 and the determination processing is repeatedly performed until it is determined that the operation state is the operation state d.

In contrast, in the case where it is determined that the operation state is the operation state d in Step S57 or where it is determined that the operation state is the operation state d in Step S54, the processing of Step S58 is performed.

In Step S58, the zoom control unit 42 sets the zoom state to the zoom state Z(2). Accordingly, for example, zoom control is performed such that the subject is zoomed in depending on the deceleration of the panning speed.

In Step S59, the zoom control unit 42 determines whether or not the user's operation obtained by the determination of Step S16 in FIG. 7 is the operation state b.

In Step S59, in the case where it is determined that the operation state is the operation state b, the processing returns to Step S53 and the above-described processing is repeatedly performed.

It should be noted that in the case where it is determined that the operation state is the operation state b in Step S59, the operation state changes with time from the operation state d to the operation state b. In such a case, the zoom control unit 42 may determine the zoom magnification such that the zoom magnification remains to be the zoom magnification at the current time, i.e., to have a constant magnitude, for example, as described with reference to FIG. 4. In addition, at the time when the value of the angular velocity ω becomes negative, the zoom magnification may remain to be the zoom magnification at the current time.

In contrast, in the case where it is determined that the operation state is not the operation state b in Step S59, the zoom control unit 42 weights the operation state b to prevent the zoom state from transiting from the zoom state Z(2) to the zoom state Z(4), and the processing proceeds to Step S60.

In the case where the operation state is determined by the method described with reference to FIG. 8 or FIG. 9, for example, the zoom control unit 42 makes it difficult for the operation state to be the operation state b by adjusting the position and size of the area corresponding to the operation state b such as the area R12 in FIG. 8. In addition, in the case where the operation state is determined by the method described with reference to FIG. 10, for example, the zoom control unit 42 makes it difficult for the operation state to be the operation state b by decreasing the threshold value th of the operation state b.

In Step S60, the zoom control unit 42 determines whether or not the zoom magnification Z is the zoom magnification $Z_{max}$.

In the case where it is determined that the zoom magnification Z is not the zoom magnification $Z_{max}$ in Step S60, the processing returns to Step S59 and the above-mentioned processing is repeatedly performed. Specifically, in the case where the zoom state is the zoom state Z(2), zoom control is performed such that the zoom magnification Z increases with time by a predetermined amount until the zoom magnification Z becomes the zoom magnification $Z_{max}$.

On the other hand, in the case where the zoom magnification Z is the zoom magnification $Z_{max}$ in Step S60, the zoom control unit 42 sets the zoom state to the zoom state Z(3) in Step S61. Accordingly, for example, the zoom magnification of the image capturing lens 21 remains to be the zoom magnification $Z_{max}$, i.e., to be on the telephoto side, while the user stops the panning operation.

If the processing of Step S61 is performed, then, the processing returns to Step S52 and the above-mentioned processing is repeatedly performed until the zoom state determining processing is finished.

The image capturing apparatus 11 transits the zoom state depending on the user's operation state in this way. By determining the zoom state depending on the operation state as described above, it is possible to perform appropriate zoom control.

Second Embodiment

<Illustration for Image Capturing Processing>

It should be noted that although an example in which the actually-detected (measured) most recent N angular velocities are used to determine the user's operation state has been described, some most recent angular velocities may be used to estimate the angular velocity at the next time to determine the operation state with the angular velocity obtained by the estimation. In such a case, the image capturing apparatus 11 performs the image capturing processing shown in FIG. 12, for example.

In the following, the image capturing processing by the image capturing apparatus 11 will be described with reference to the flow chart of FIG. 12. It should be noted that because the processing of Step S91 to Step S94 is the same as that of Step S11 to Step S14 in FIG. 7, a description thereof will be omitted.

In Step S95, the control unit 25 controls the memory 33 to delete the angular velocity that proceeds by 2 velocities therefrom out of the angular velocities ω at the times stored in the memory 33. Accordingly, the angular velocities ω at the most recent 2 times are stored in the memory 33.

In Step S96, the operation determination unit 41 calculates the angular acceleration based on the most recent 2 angular velocities ω stored in the memory 33, and estimates the angular velocity at the next time of the obtained angular acceleration, i.e., future time. For example, by obtaining the difference between the two angular velocities, the angular acceleration is obtained. Because the angular acceleration is time change of the angular velocity, the angular velocity at the future time can be predicted if the angular acceleration is known.

In Step S97, the operation determination unit 41 determines the user's operation by comparing the most recent 2 angular velocities ω stored in the memory 33 and angular velocity ω at the next time estimated in the processing of Step S96 with the database recorded in the recording unit 31 in advance.

It should be noted that although the processing of Step S97 is different from Step S16 in FIG. 7 in that the angular velocity obtained by the estimation as well as the actually-detected angular velocity ω re used to determine the operation state, the user's operation state is determined by the same processing as that of Step S16.

If the user's operation state is determined, then, the processing of Step S98 to Step S101 is performed and the image capturing processing is finished. Because the processing is the same as that of Step S17 to Step S20 in FIG. 7, a description thereof will be omitted.

As described above, the image capturing apparatus 11 uses the detected 2 angular velocities to estimate the angular velocity at the next time, uses the angular velocity estimated by the estimation and the actually-detected angular velocity to determine the user's operation state, and performs the zoom control depending on the operation state.

As described above, by using 2 angular velocities to estimate the angular velocity at the next time, it is possible to detect, for example, the starting or terminating of the panning operation more rapidly, and to reduce the time deviation between the user's operation and the appropriate zoom control for the user's operation. In addition, it is possible to reduce the number of angular velocities stored in the memory 33 to reduce the memory capacity of the memory 33.

It should be noted that although an example in which the most recent 2 angular velocities are stored in the memory 33 has been described here, any number of angular velocities may be stored as long as it is not less than 2.

Third Embodiment

<Configuration Example of Image Capturing Apparatus>

Figure 13:
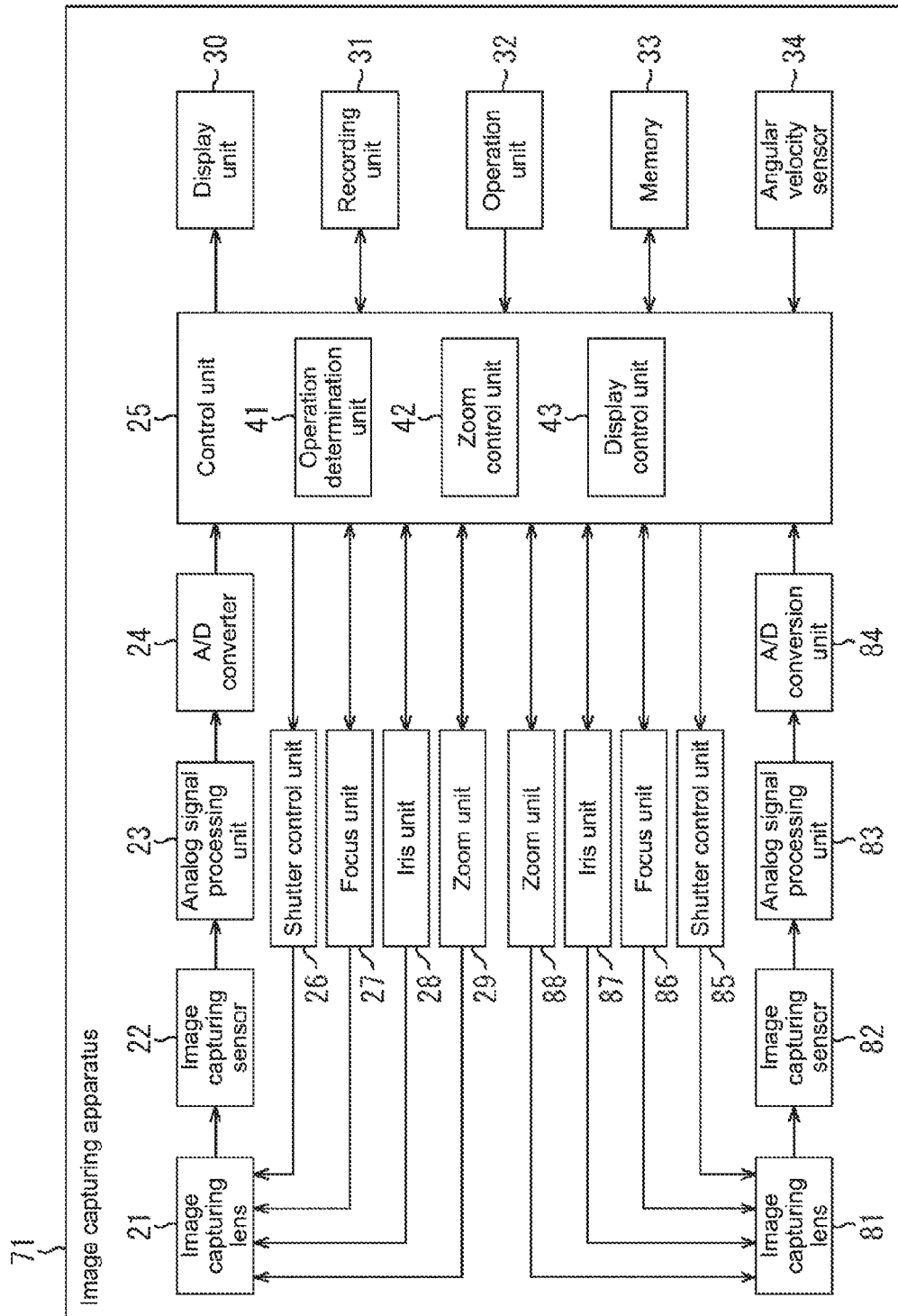
FIG. 13 A drawing showing a configuration example of an image capturing apparatus.

Furthermore, although an example in which the image capturing apparatus 11 is monocular has been described, the image capturing apparatus may be a compound eye one. In such a case, the image capturing apparatus is configured as shown in FIG. 13, for example. It should be noted that in FIG. 13, the same components as those in FIG. 1 will be denoted by the same reference symbols and a description thereof will be omitted appropriately.

An image capturing apparatus 71 shown in FIG. 13 is made of a binocular, for example, and the image capturing apparatus 71 includes the image capturing lens 21 to the angular velocity sensor 34, an image capturing lens 81, an image capturing sensor 82, an analog signal processing unit 83, an A/D conversion unit 84, a shutter control unit 85, a focus unit 86, an iris unit 87, and a zoom unit 88.

Specifically, the image capturing apparatus 71 has a configuration that is obtained by adding, to the configuration of the image capturing apparatus 11, the image capturing lens 81 to the zoom unit 88.

The image capturing lens 81 to A/D conversion unit 84 correspond to the image capturing lens 21 to The A/D converter 24, capture an image having disparity from the image obtained from the image capturing lens 21 to the A/D converter 24, and supplies the obtained image to the control unit 25.

In addition, the shutter control unit 85 to the zoom unit 88 correspond to the shutter control unit 26 to the zoom unit 29, and perform the shutter control, focus control, iris driving, and zoom of the image capturing lens 81.

In addition, the display unit 30 has a display area for presenting an image to the user's right eye and a display area for displaying an image to the user's left eye, for example.

<Illustration for Image Capturing Processing>

Figure 14:
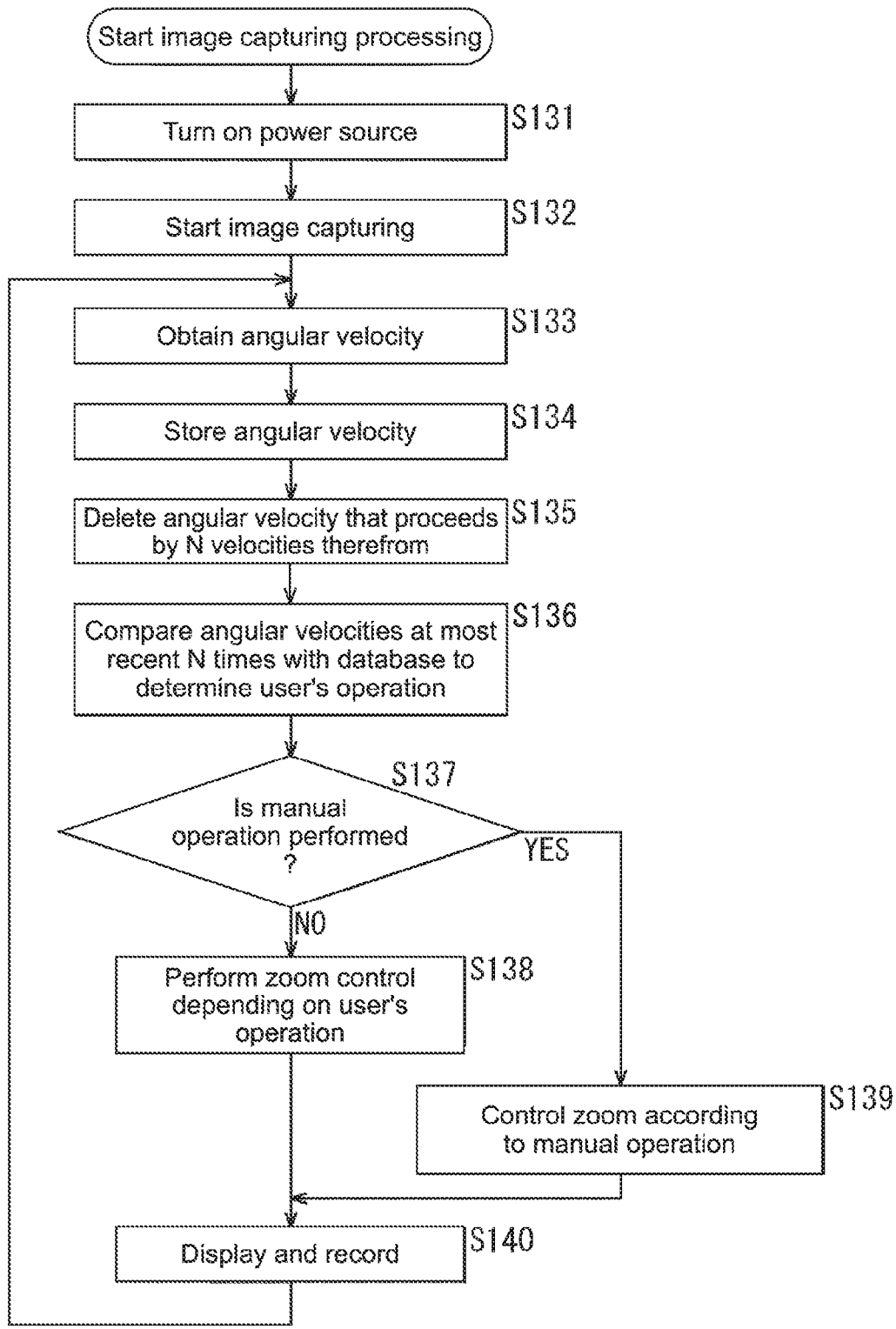
FIG. 14 A flow chart for illustrating image capturing processing.

Next, the operation of the image capturing apparatus 71 will be described. In the following, the image capturing processing performed by the image capturing apparatus 71 will be described with reference to the flow chart of FIG. 14.

It should be noted that because the processing of Step S131 is the same as that of Step S11 in FIG. 7, a description thereof will be omitted.

In Step S132, the image capturing apparatus 71 starts image capturing.

Specifically, the image capturing lens 21 to the A/D converter 24 successively perform processing to capture an image of the subject, generate image data, and supply it to the control unit 25, and also the image capturing lens 81 to the A/D conversion unit 84 successively perform processing to capture an image of the subject, generate image data, and supply it to the control unit 25. Accordingly, image data of two images having disparity is obtained.

If the image capturing is started, then, the processing of Step S133 to Step S140 is performed and the image capturing processing is finished. Because the processing is the same as that of Step S13 to Step S20 in FIG. 7, a description thereof will be omitted. It should be noted that in Step S140, two images having disparity are displayed on the display unit 30 and recorded in the recording unit 31.

As described above, the image capturing apparatus 71 determines the user's operation state based on the angular velocities at the plurality of times, and performs zoom control depending on the operation state. Accordingly, it is possible to identify the operation state in more detail, and to perform appropriate zoom control depending on the user's operation state.

Fourth Embodiment

<Illustration for Image Capturing Processing>

Figure 15:
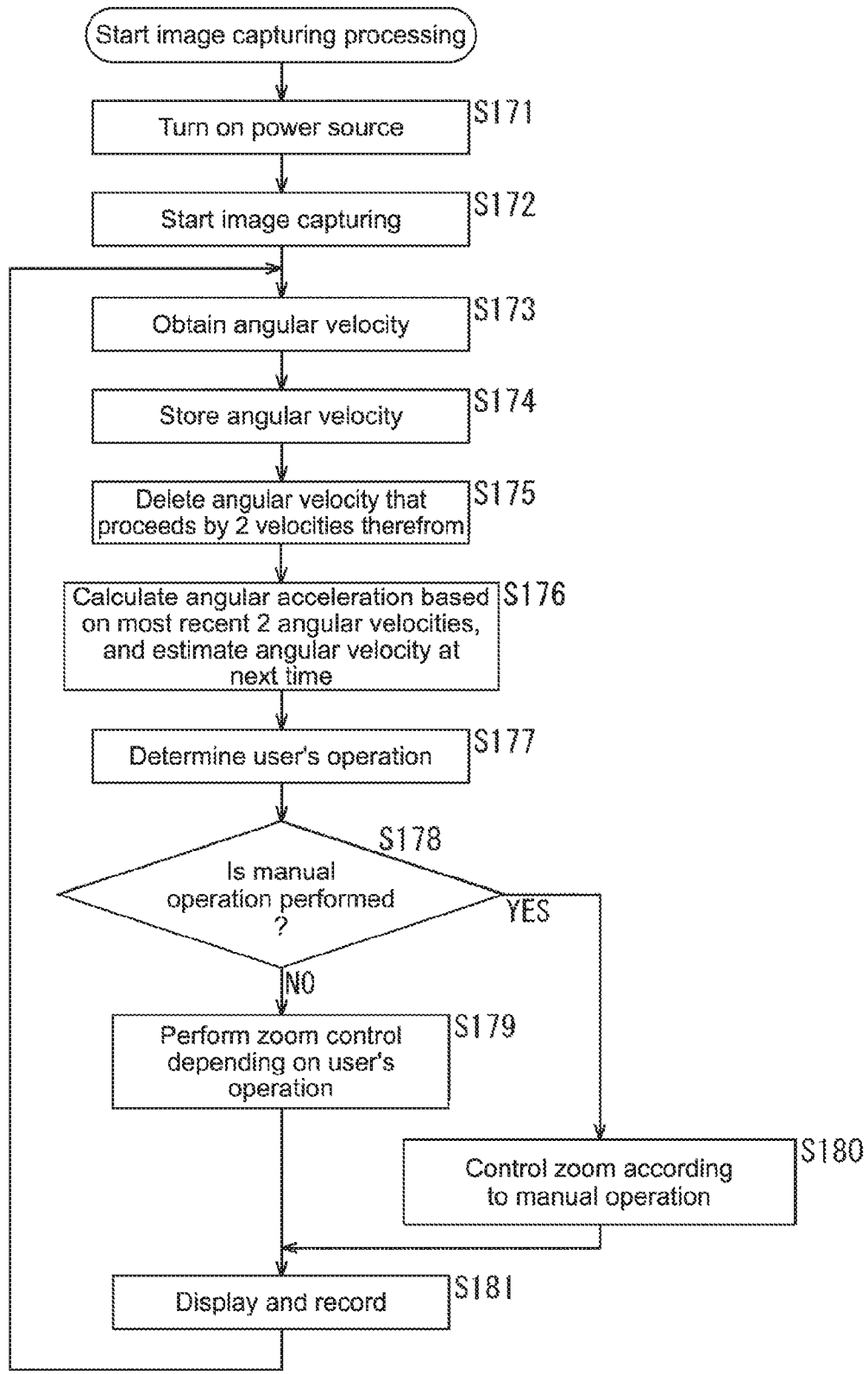
FIG. 15 A flow chart for illustrating image capturing processing.

Also in the image capturing apparatus 71, the angular velocity at the next time may be estimated to determine the user's operation. In such a case, the image capturing apparatus 71 performs the image capturing processing shown in FIG. 15. In the following, the image capturing processing performed by the image capturing apparatus 71 will be described with reference to the flow chart of FIG. 15.

Figure 12:
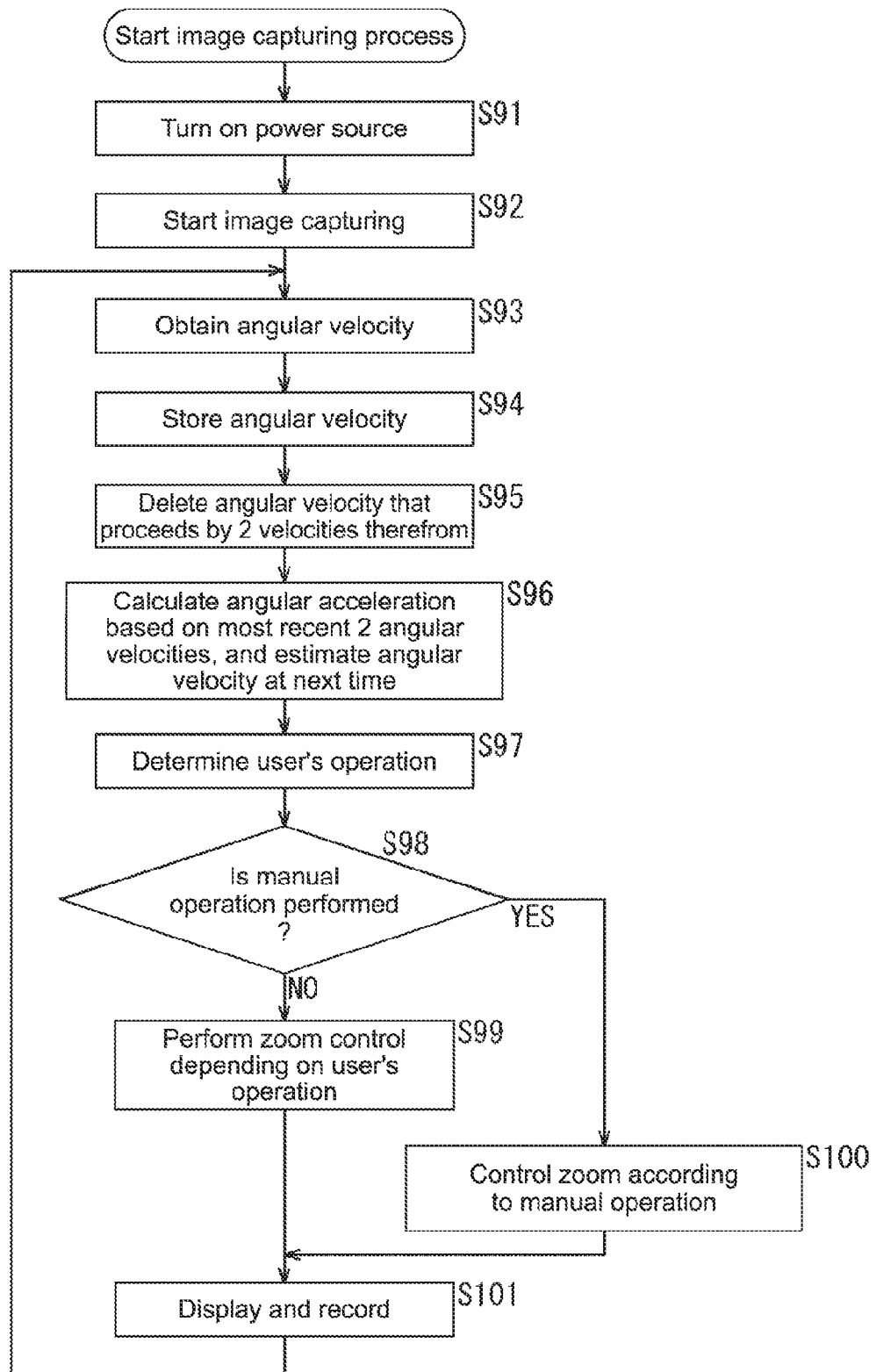
FIG. 12 A flow chart for illustrating image capturing processing.

It should be noted that because the processing of Step S171 is the same as that of Step S91 in FIG. 12, a description thereof will be omitted.

In Step S172, the image capturing apparatus 71 starts image capturing.

Specifically, the image capturing lens 21 to the A/D converter 24 successively perform processing to capture an image of the subject, generate image data, and supply it to the control unit 25, and also the image capturing lens 81 to A/D conversion unit 84 successively perform processing to capture an image of the subject, generate image data, and supply it to the control unit 25. Accordingly, image data of two images having disparity is obtained.

If image capturing is started, then, the processing of Step S173 to Step S181 is performed and the image capturing processing is finished. Because the processing is the same as that of Step S93 to Step S101 in FIG. 12, a description thereof will be omitted. It should be noted that in Step S181, two images having disparity are displayed on the display unit 30 and recorded in the recording unit 31.

As described above, the image capturing apparatus 71 uses the detected 2 angular velocities to estimate the angular velocity at the next time, uses the angular velocity obtained by the estimation and the actually-detected angular velocity to determine the user's operation state, and performs zoom control depending on the operation state. Accordingly, it is possible to detect the user's operation more rapidly, and to reduce the time deviation between the user's operation and the appropriate zoom control for the user's operation. In addition, it is possible to reduce the number of angular velocities stored in the memory 33 to reduce the memory capacity of the memory 33.

Fifth Embodiment

<Configuration Example of Image Capturing Apparatus>

Figure 16:
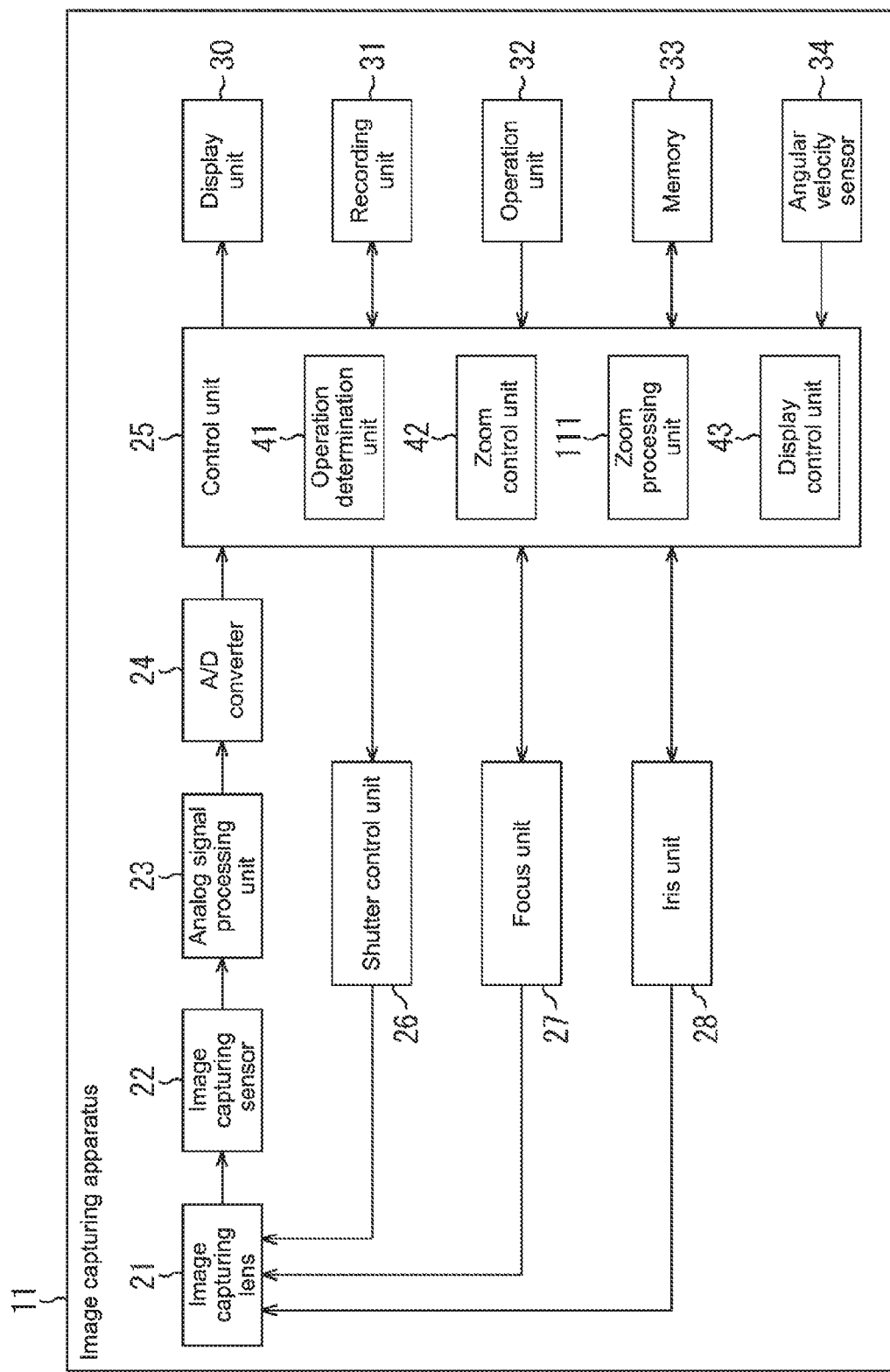
FIG. 16 A drawing showing a configuration example of an image capturing apparatus.

In addition, although an example of optical zoom in which the angle of view of an image is changed by changing the zoom magnification of the image capturing lens 21 has been described, the angle of view of an image may be changed by digital zoom. In such a case, the image capturing apparatus 11 is configured as shown in FIG. 16. It should be noted that in FIG. 16, the same components as those in FIG. 1 will be denoted by the same reference symbols and a description thereof will be omitted appropriately.

The image capturing apparatus 11 shown in FIG. 16 includes the image capturing lens 21 to the iris unit 28, and the display unit 30 to the angular velocity sensor 34. Specifically, the image capturing apparatus 11 shown in FIG. 16 has the same configuration as that of the image capturing apparatus 11 shown in FIG. 1 except that the zoom unit 29 is not provided. In addition, in the image capturing apparatus 11 shown in FIG. 16, a zoom processing unit 111 is further provided on the control unit 25.

The zoom processing unit 111 zooms an image by cutting a partial area of the image based on the image data supplied from the A/D converter 24 under control of the zoom control unit 42.

<Illustration of Image Capturing Processing>

Next, the operation of the image capturing apparatus 11 shown in FIG. 16 will be described. In the following, the image capturing processing performed by the image capturing apparatus 11 having the configuration shown in FIG. 16 will be described with reference to the flow chart of FIG. 17.

It should be noted that the processing of Step S211 to Step S217 is the same as that of Step S11 to Step S17 in FIG. 7, a description thereof will be described.

In the case where it is determined that the manual operation is not performed in Step S217, the zoom control unit 42 performs zoom control depending on the user's operation state at the current time in Step S218.

Figure 11:
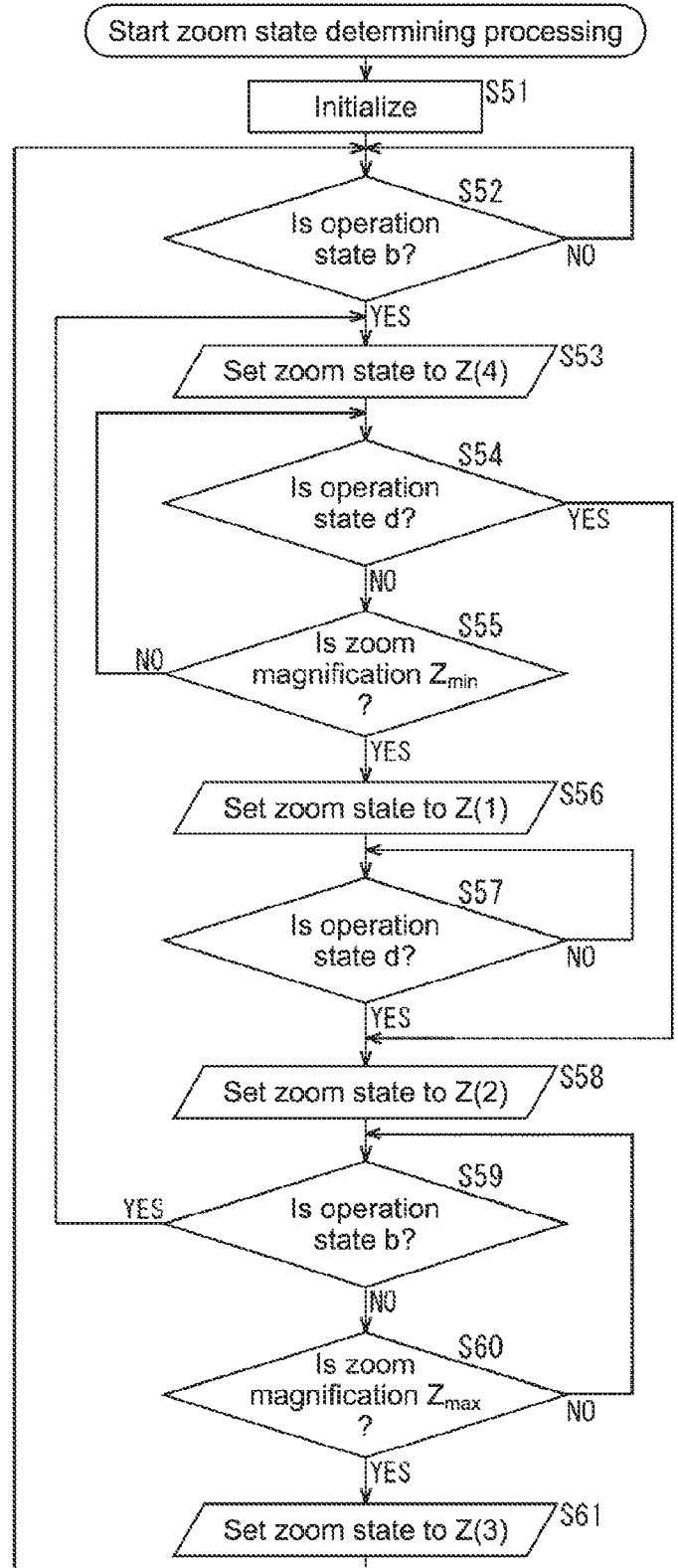
FIG. 11 A flow chart for illustrating zoom state determination processing.

Specifically, when the zoom control unit 42 determines appropriate zoom state by the zoom state determining processing shown in FIG. 11 based on the operation state determined by the processing of Step S216, a new zoom magnification at the next time is determined based on the zoom state and the zoom magnification at the current time.

Then, the zoom processing unit 111 cuts an area defined by the new zoom magnification in an image based on the image data supplied from the A/D converter 24 to produce a finally-captured image, i.e., zoom-processed image. For example, the central position of the captured image is the center, the area having the size defined by the new zoom magnification is cut, and the zoom-processed image, i.e., image captured with a predetermined zoom magnification is produced.

It should be noted that in the following, the image generated by the cutting by the zoom processing unit 111, i.e., the zoom-processed image is referred to also as zoom image.

As described above, it is possible to perform appropriate zoom control by determining the zoom state depending on the user's operation state. If the zoom control is performed in Step S218, then, the processing proceeds to Step S220.

In addition, in the case where it is determined that the manual operation is performed in Step S217, the zoom control unit 42 controls zoom according to the user's manual operation, i.e., in accordance with the signal supplied from the operation unit 32 in Step S219. The zoom processing unit 111 cuts an area defined by the zoom magnification designated by the user from the image based on the image data supplied from the A/D converter 24 under control of the zoom control unit 42 to produce the zoom image captured with the designated zoom magnification, If the zoom control is performed in Step S219 according to the user's operation, then, the processing proceeds to Step S220.

When the zoom control is performed in Step S218 or Step S219, the display control unit 43 generates an image for display in Step S220.

Figure 18:
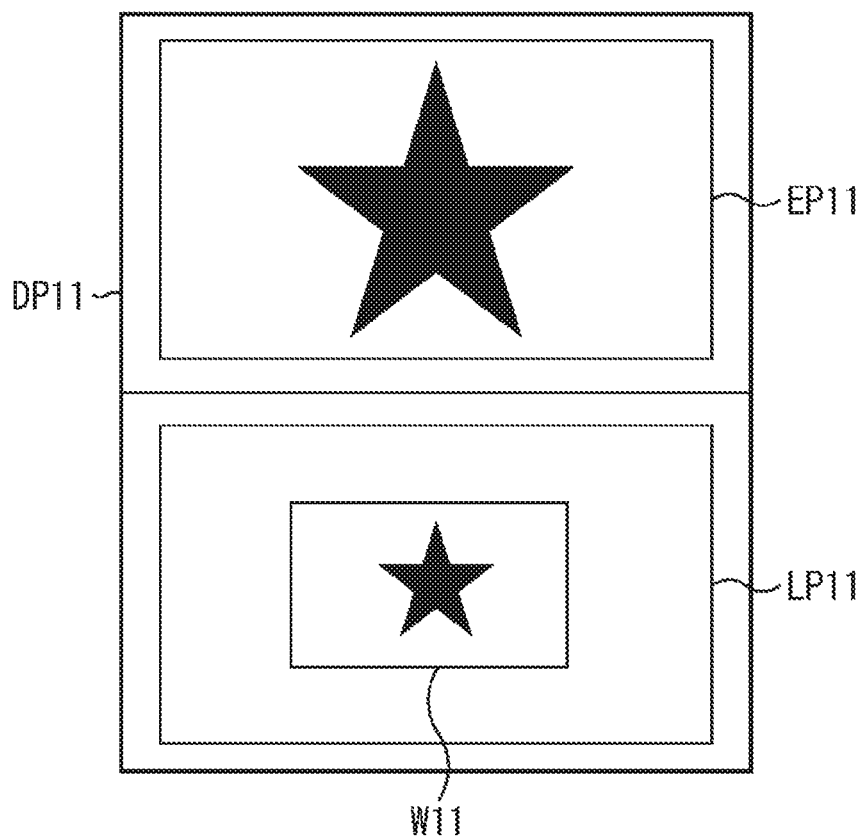
FIG. 18 A diagram showing a display example of an image.

For example, the display control unit 43 generates, as an image for display DP11, one image made of a zoom image EP11 obtained by the zoom processing in Step S218 or Step S219 and an original image LP11 for obtaining the zoom image EP11, as shown in FIG. 18. In other words, the image of a screen obtained by simultaneously arranging the two images of the zoom image EP11 and the image LP11 is the image for display DP11.

The image for display DP11 is an image in which the zoom image EP11 is arranged on the upper side in the figure and the image LP11 is arranged on the lower side in the figure. Here, the image LP11 is an image before the zoom processing, which has been output from the A/D converter 24, i.e., the original image from which the zoom image EP11 is cut.

In addition, in this example, it is possible to see which area of the image LP11 having a wider angle of view is cut to produce the zoom image EP11 by displaying a frame W11 on an area being the zoom image EP11 in the image LP11. Accordingly, the user can easily grasp which part of the entire captured object the user watches.

Returning to FIG. 17, if an image for display is generated in Step S220, then, the processing proceeds to Step S221.

In Step S221, the control unit 25 displays and records the image based on the image data of the image for display and the image data of the zoom image.

Specifically, the display control unit 43 of the control unit 25 supplies the image data of the image for display to the display unit 30 to display the image, and the control unit 25 supplies the image data of the zoom image to the recording unit 31 to record it. It should be noted that the image before zoom processing as well as the zoom image may be recorded.

If the image is displayed and recorded in Step S221, then, the processing returns to Step S213 and the above-mentioned processing is repeatedly performed until the termination of the image capturing is instructed.

As described above, the image capturing apparatus 11 determines the user's operation state based on the angular velocities at the plurality of times, and performs the zoom control depending on the operation state. Accordingly, it is possible to identify the operation state in more detail, and to perform appropriate zoom control.

In addition, the image capturing apparatus 11 arranges the image before the zoom processing and the image after the zoom processing for display. Accordingly, it is possible to make the image more visible and to display the image more effectively.

Sixth Embodiment

<Illustration for Image Capturing Processing>

In addition, in the fifth embodiment, an example in which the image before the zoom processing as well as the zoom image are displayed has been described. However, an image having an image capturing range wider than that of the original image before the zoom processing may be displayed. Accordingly, the user can easily grasp which part of a wider range of the entire subject the user watches, especially in the case where the user holds the image capturing apparatus 11 and performs the panning operation.

Figure 19:
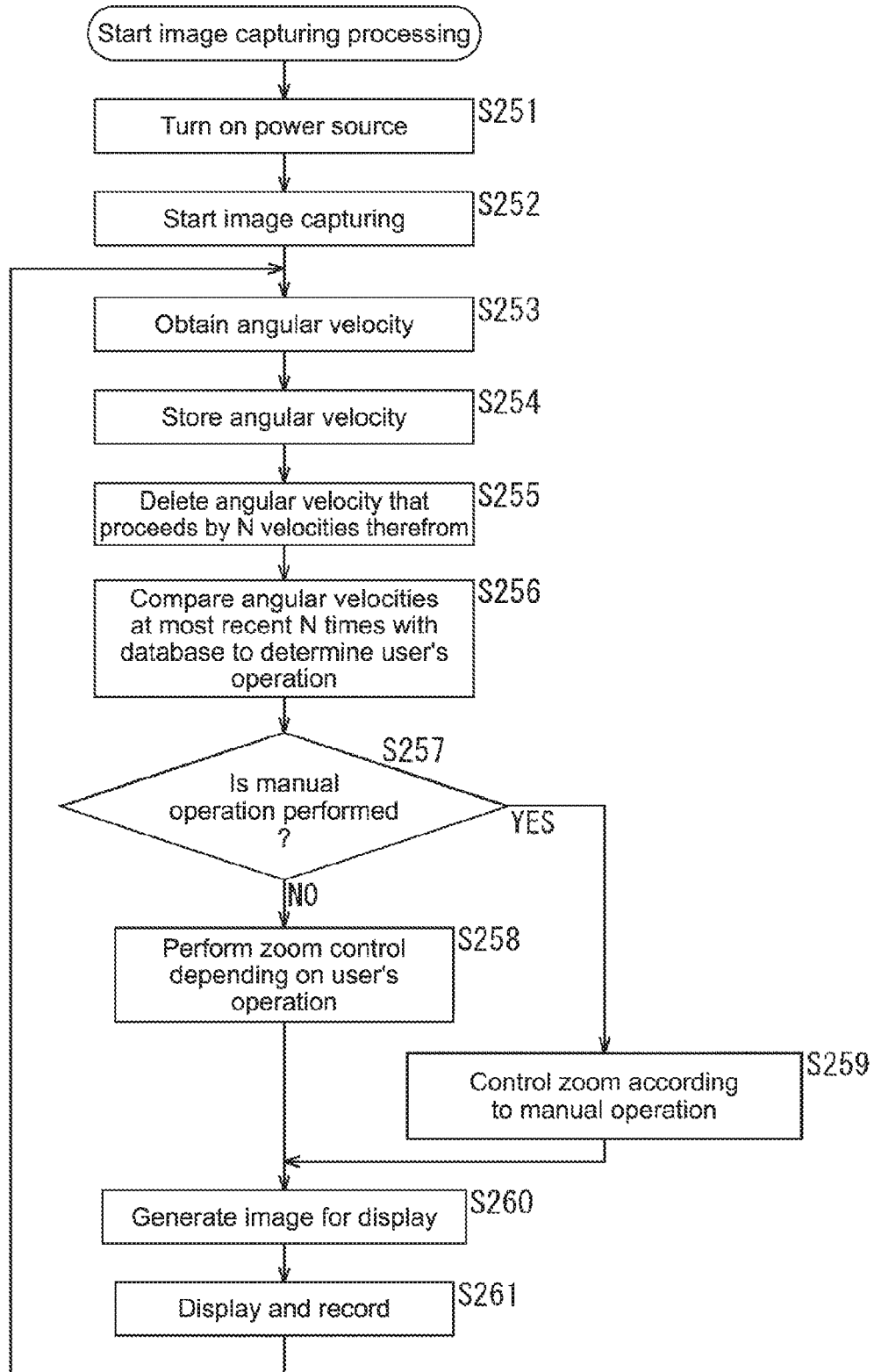
FIG. 19 A flow chart for illustrating image capturing processing.

In the case where an image is displayed in a wider range as described above, the image capturing apparatus 11 shown in FIG. 16 performs the image capturing process shown in FIG. 19. In the following, the image capturing processing performed by the image capturing apparatus 11 having the configuration shown in FIG. 16 will be described with reference to the flow chart of FIG. 19.

Figure 17:
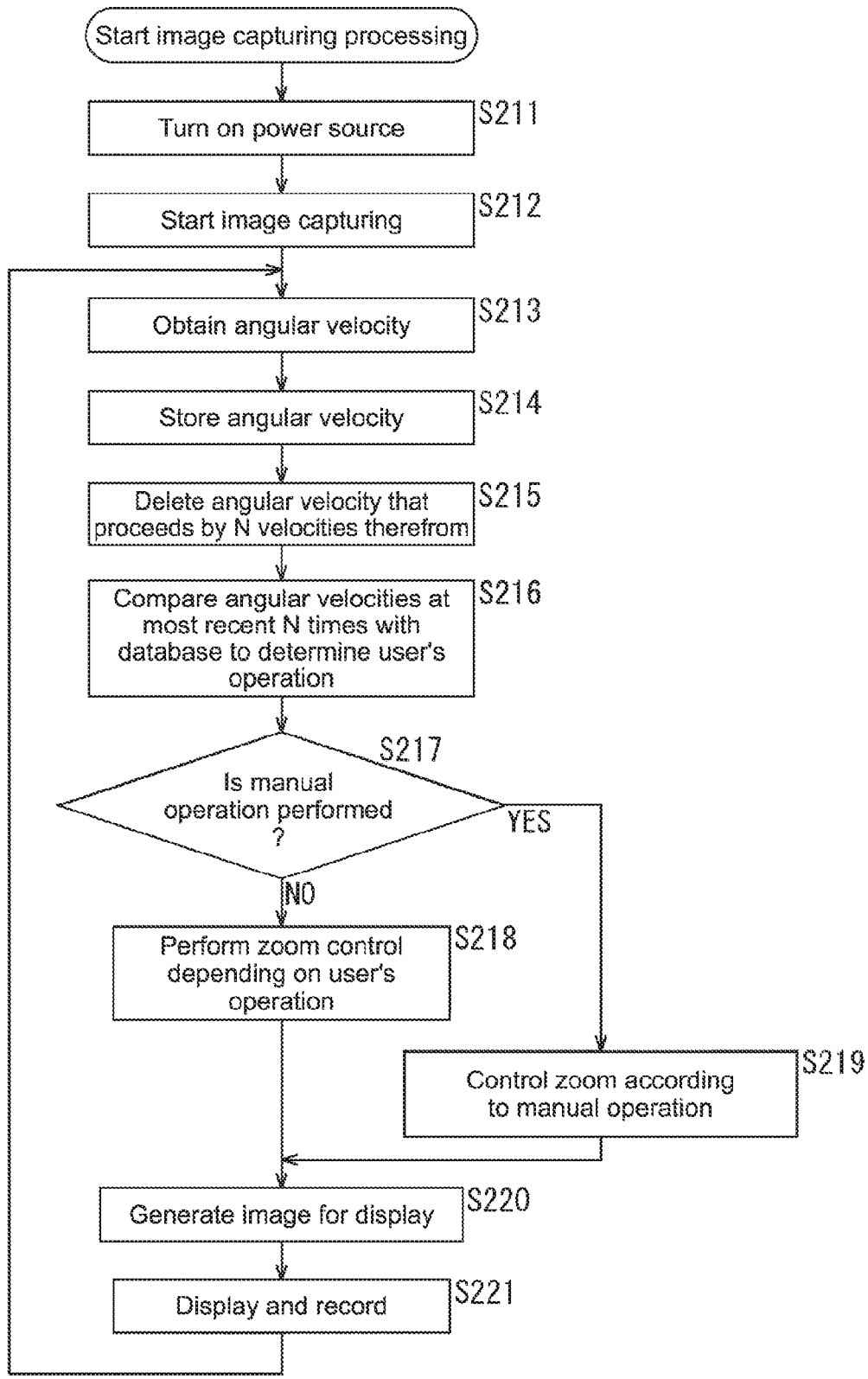
FIG. 17 A flow chart for illustrating image capturing processing.

It should be noted that because the processing of Step S251 to Step S259 is the same as that of Step S211 to Step S219 shown in FIG. 17, a description thereof will be omitted.

In Step S260, the display control unit 43 generates an image for display.

Figure 20:
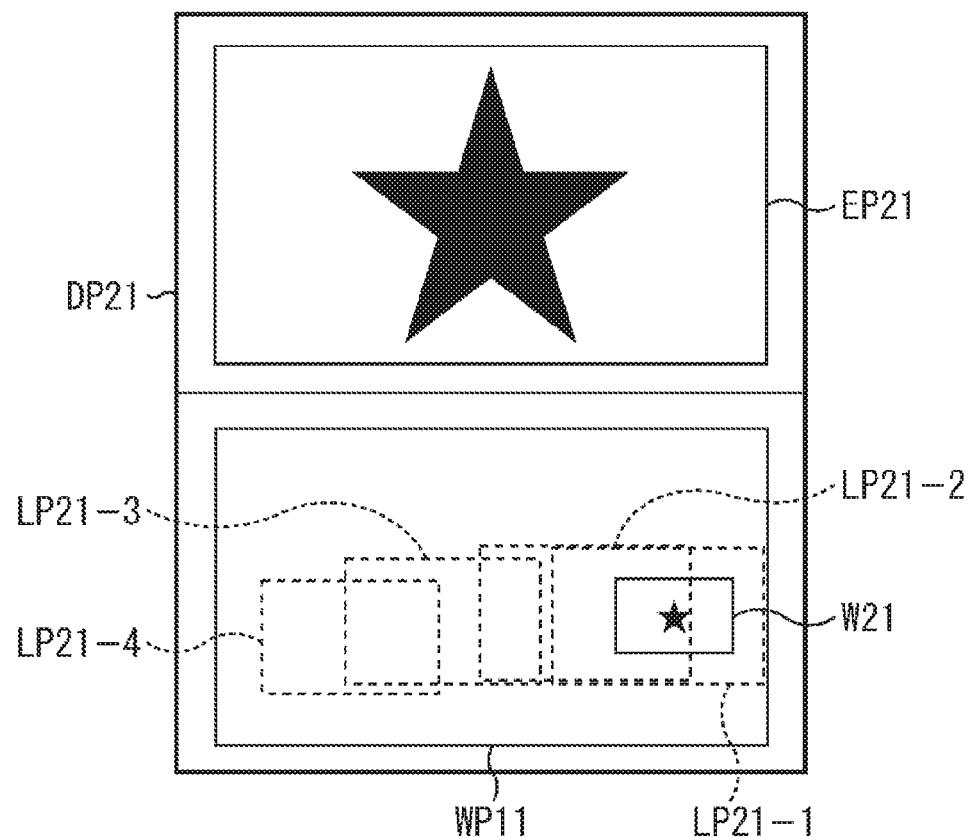
FIG. 20 A diagram showing a display example of an image.

For example, the display control unit 43 generates, as an image for display DP21, one image made of a zoom image EP21 obtained by the zoom processing in Step S258 or Step S259 and an image WP11 obtained by combining a plurality of images before the zoom processing in the past image capturing, as shown in FIG. 20.

The image for display DP21 is an image in which the zoom image EP21 is arranged on the upper side in the figure, and the image WP11 is arranged on the lower side in the figure. Here, the image WP11 is an image obtained by arranging and combining the images at the plurality of times before the zoom processing in the past image capturing, which include the original image for obtaining the zoom image EP21, i.e., the plurality of images output from the A/D converter 24 so that the same subjects are overlapped. In the example shown in FIG. 20, dotted line frames LP21-1 to LP21-4 on the image WP11 represent images to generate the image WP11. It should be noted that these frames LP21-1 to LP21-4 are not represented in the image WP11.

In addition, in this example, is possible to see which area in a wider image capturing range is the image capturing area of the zoom image EP21 by displaying a frame W21 on an area being the zoom image EP21 in the image WP11. Accordingly, the user can easily grasp which part of the entire capturing object the user watches.

Returning to FIG. 19, if the image for display is generated in Step S260, then, the processing of Step S261 is performed and the image capturing processing is finished. Because the processing of Step S261 is the same as that of Step S221 in FIG. 17, a description thereof will be omitted. It should be noted that in Step S261, an image obtained by combining a plurality of images before the zoom processing as well as the zoom image may be recorded.

As described above, the image capturing apparatus 11 determines the operation state based on the angular velocities at the plurality of times, and performs zoom control depending on the operation state. Accordingly, it is possible to identify the operation state in more detail, and to perform appropriate zoom control.

In addition, the image capturing apparatus 11 arranges an image having an image capturing range wider than that of the image before the zoom processing and the zoom image for display. Accordingly, it is possible to make the image more visible and to display the image more effectively.

Seventh Embodiment

<Configuration Example of Image Capturing Apparatus>

In addition, in the case where digital zoom processing is performed in the image capturing apparatus 11, image capturing processing and object recognition processing may be combined to zoom in the object if the object is detected near the image center, for example.

Figure 21:
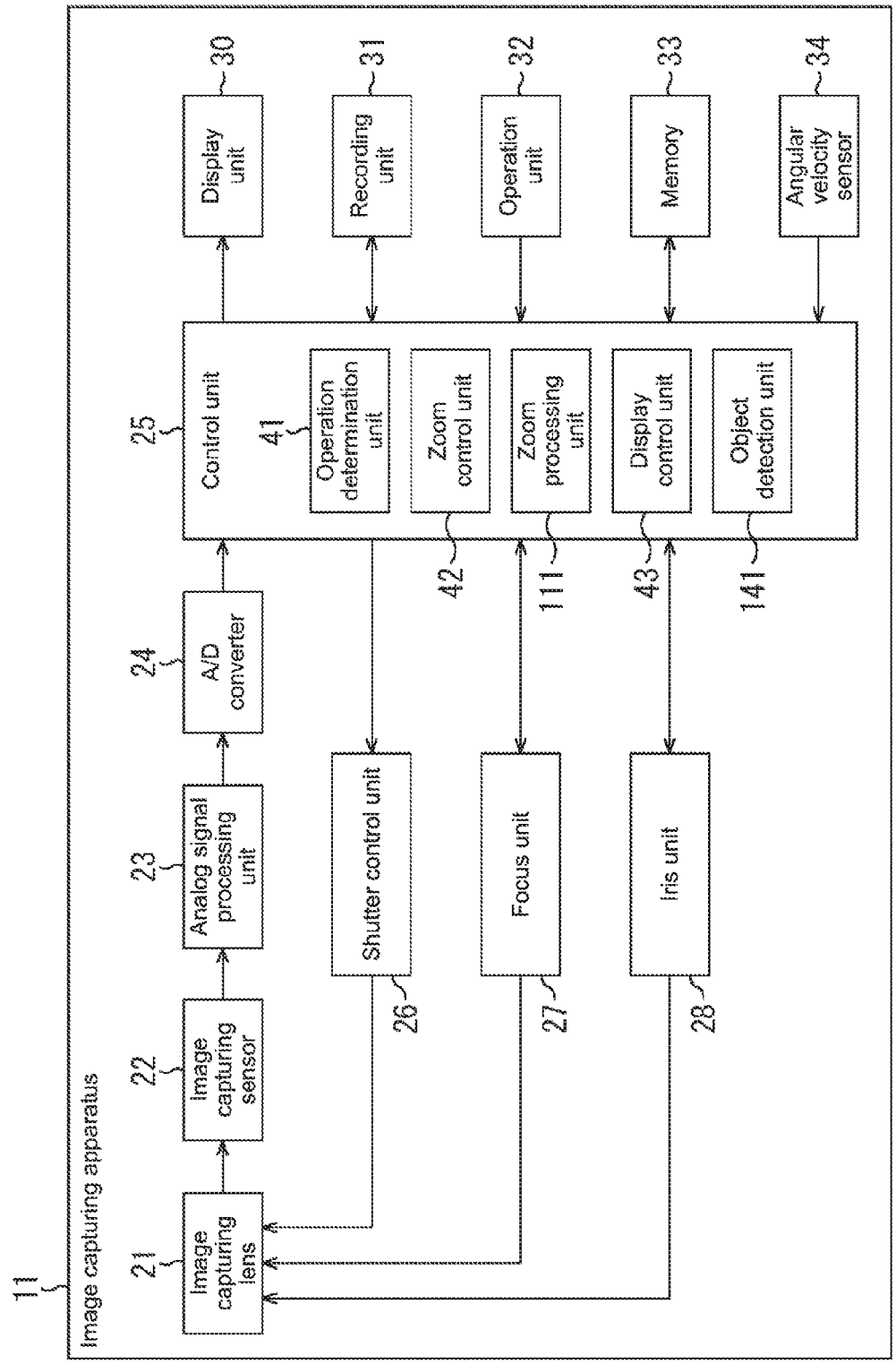
FIG. 21 A diagram showing a configuration example of an image capturing apparatus.

In the case where the processing combining the image capturing processing with the object recognition processing is performed as described above, the image capturing apparatus 11 is configured as shown in FIG. 21, for example. It should be noted that in FIG. 21, the same components as those in FIG. 16 will be denoted by the same reference symbols and a description thereof will be omitted appropriately.

The image capturing apparatus 11 shown in FIG. 21 has a configuration obtained by further providing an object detection unit 141 to the control unit 25 of the image capturing apparatus 11 shown in FIG. 16.

The object detection unit 141 performs object recognition processing on the image supplied from the A/D converter 24 to detect an object from the image.

<Illustration for Image Capturing Processing>

Next, the operation of the image capturing apparatus 11 shown in FIG. 21 will be described. In the following, the image capturing processing performed by the image capturing apparatus 11 having the configuration shown in FIG. 21 will be described with reference to the flow chart of FIG. 22.

It should be noted that because the processing of Step S291 to Step S297 is the same as that of Step S211 to Step S217 in FIG. 17, a description thereof will be omitted.

In the case where it is determined that the manual operation is not performed in Step S297, the zoom control unit 42 performs zoom control depending on the user's operation state at the current time in Step S298.

Figure 22:
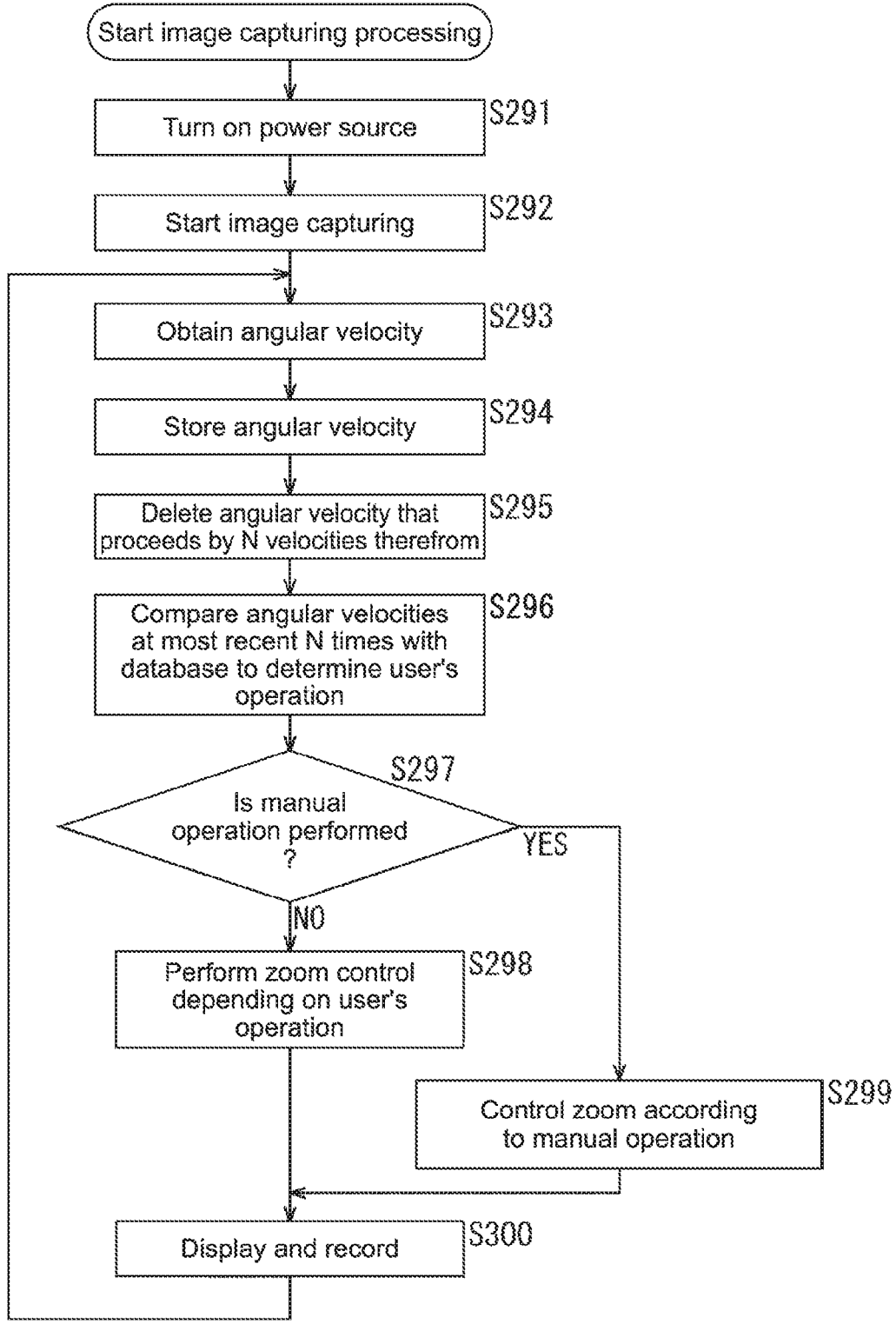
FIG. 22 A flow chart for illustrating image capturing processing.

Specifically, when the zoom control unit 42 determines an appropriate zoom state by the zoom state determining processing shown in FIG. 11 based on the operation state determined by the processing of Step S296, a new zoom magnification is determined based on the zoom state and the zoom magnification at the current time. It should be noted that in the case where the image capturing processing shown in FIG. 22 is performed as will be described later, the object recognition as well as the zoom state determining processing described with reference to FIG. 11 are performed. If an object is detected near the image center, processing to preferably keep the zoom state is performed.

When a new zoom magnification is determined, the zoom processing unit 111 cuts an area defined by the new zoom magnification in the image based on the image data supplied from the A/D converter 24 to produce an image captured with the new zoom magnification, i.e., zoom image.

If the zoom control is performed in Step S298, then, the processing proceeds to Step S300.

On the other hand, in the case where it is determined that the manual operation is performed in Step S297, the zoom control unit 42 controls zoom according to the user's manual operation, i.e., in accordance with the signal supplied from the operation unit 32 in Step S299. The zoom processing unit 111 cuts, under the control of the zoom control unit 42, an area defined by the zoom magnification designated by the user from the image based on the image data supplied from the A/D converter 24 to produce the zoom image captured with the zoom magnification designated by the user.

If the zoom control is performed in Step S299, then, the processing proceeds to Step S300.

When the zoom control is performed in Step S298 or Step S299, the control unit 25 displays and records an image based on the image data of the zoom image zoom-processed by the zoom processing unit 111 in Step S300.

Specifically, the display control unit 43 of the control unit 25 supplies the image data to the display unit 30 to display the zoom image, and the control unit 25 supplies the image data to the recording unit 31 to record it.

If the image is displayed and recorded in Step S300, then, the processing returns to Step S293 and the above-mentioned processing is repeatedly performed until the termination of the image capturing processing is instructed.

As described above, the image capturing apparatus 11 determines the user's operation state based on the angular velocities at the plurality of times, and performs zoom control depending on the operation state. Accordingly, it is possible to identify the operation state in more detail, and to perform appropriate zoom control.

<Illustration for Adjustment Processing>

In addition, the image capturing apparatus 11 shown in FIG. 21 performs object recognition as well as the zoom state determining processing described with reference to FIG. 11, and performs adjustment processing that is processing to preferably keep the zoom state in the case where an object is detected near the image center. In the following, the adjustment processing performed by the image capturing apparatus 11 will be described with reference to the flow chart of FIG. 23.

In Step S331, the object detection unit 141 performs object recognition processing on the image supplied from the A/D converter 24 to detect an object from the image.

For example, the object detection unit 141 detects, from the image, the object determined in advance, by comparing the feature amount of an arbitrary object prepared in advance and the feature amount extracted from the image. Moreover, for example, the object detection unit 141 may perform face recognition to detect, from the image, the face of a person registered in advance as an object to be detected or the face of an arbitrary person.

In Step S332, the zoom control unit 42 determines whether or not an object is detected from near the center of the image captured by the image capturing sensor 22 in the processing of Step S331. For example, in the case where an object is detected from the area that includes the image center and has a predetermined size determined in advance, it is determined that the object is detected near the image center.

In the case where it is determined that the object is not detected in Step S332, the processing returns to Step S331 and the above-mentioned processing is repeatedly performed.

In contrast, in the case where it is determined that the object is detected in Step S332, the zoom control unit 42 makes it difficult to select, in Step S333, the operation state b as the user's operation state by the processing of Step S296 in FIG. 22. In other words, the zoom control unit 42 makes it difficult to determine the operation state as the operation state b in Step S52 and Step S59 in FIG. 11. The zoom control unit 42 makes it easy to select the operation state d as the user's operation state by the processing of Step S296 in FIG. 22. In other words, the zoom control unit 42 make is easy to determine the operation state as the operation state d in Step S54 and Step S57 in FIG. 11.

Specifically, in the case where the operation state is determined by the method described with reference to FIG. 8 or FIG. 9, for example, the zoom control unit 42 makes it difficult to select the operation state b, by adjusting the position and size of the area corresponding to the operation state b such as the area R12 of FIG. 8. In addition, in the case where the operation state is determined by the method described with reference to FIG. 10, for example, the zoom control unit 42 makes it difficult to select the operation state b, by decreasing the threshold value th of the operation state b. Similarly, in the case where the operation state is determined by the method described with reference to FIG. 8 or FIG. 9, the zoom control unit 42 makes it easy to select the operation state d, by adjusting the position and size of the area corresponding to the operation state d such as the area R14 in FIG. 8. In addition, in the case where the operation state is determined by the method described with reference to FIG. 10, for example, the zoom control unit 42 makes it easy to select the operation state d, by increasing the threshold value th of the operation state d.

Accordingly, in the case where the object is zoomed up (enlarged) so that the object (subject) at the image center is largely displayed, for example, the operation state is prevented from transiting to the operation state b and it makes difficult to zoom out the subject. Specifically, in the case where an object is detected at the image center, the zoom control unit 42 performs zoom control so that the state in which the object is zoomed up (enlarged) is preferably kept. In addition, the operation state becomes easy to transit to the operation state d, and the object is easy to be zoomed up. In the case where a subject is detected near the image center and the panning speed is decelerated, for example, the object is zoomed in.

In Step S334, the zoom control unit 42 determines the zoom magnification $Z_{max}$ depending on the size of the object detected from the image.

Specifically, the zoom control unit 42 sets the value of the zoom magnification $Z_{max}$ to the value defined by the size of the object detected from the image. For example, the value of the zoom magnification $Z_{max}$ is determined so that the detected object does not stick out from the image itself or the frame displayed on the image.

If the zoom magnification $Z_{max}$ is determined, then, the processing returns to Step S331 and the above-mentioned processing is repeated. Then, when the zoom state determining processing in FIG. 11 is finished, the adjustment processing is also finished.

As described above, the image capturing apparatus 11 detects an object from the image, and adjusts the selectability of the operation state or the zoom magnification $Z_{max}$ depending on the detection result. Accordingly, when the user finds the subject to be observed, i.e., the object is located at near the image center, it is possible to preferably keep the state where the object is zoomed up.

Eighth Embodiment

<Illustration for Image Capturing Processing>

Figure 24:
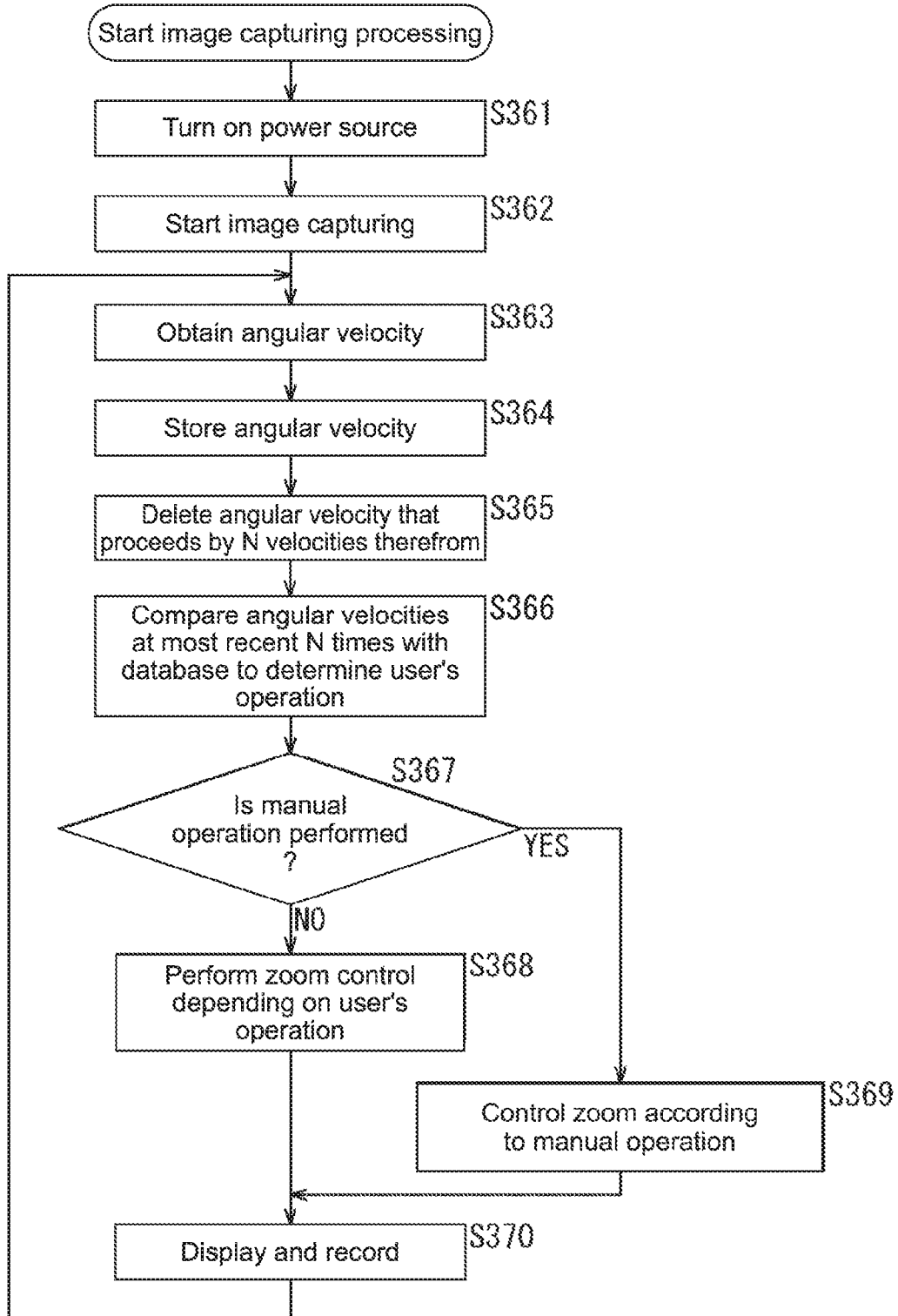
FIG. 24 A flow chart for illustrating image capturing processing.

In addition, in the case where an object is detected in the image in the image capturing apparatus 11 shown in FIG. 21, an area including the object may be cut as the zoom-processed image. In such a case, the image capturing apparatus 11 performs image capturing processing as shown in FIG. 24, for example. In the following, the image capturing processing performed by the image capturing apparatus 11 having the configuration shown in FIG. 21 will be described with reference to the flow chart of FIG. 24.

It should be noted that because the processing of Step S361 to Step S367 is the same as that of Step S291 to Step S297 in FIG. 22, a description thereof will be omitted.

In the case where it is determined that the manual operation is not performed in Step S367, the zoom control unit 42 performs zoom control depending on the user's operation state at the current time in Step S368.

Specifically, when the zoom control unit 42 determines appropriate zoom state by the zoom state determining processing of FIG. 11 based on the operation state determined in the processing of Step S366, a zoom magnification is determined based on the zoom state and the zoom magnification at the current time. It should be noted that in the case where the image capturing processing of FIG. 24 is performed as will be described later, the processing to perform object recognition to define the position of the area cut by the zoom processing based on the recognition result as well as the zoom state determining processing described with reference to FIG. 11 are performed.

When a new zoom magnification is determined, the zoom processing unit 111 cuts the area in the position determined in advance depending on the detection (recognition) result of the object, which has the size defined by the new zoom magnification in the image based on the image data supplied from the A/D converter 24. Then, the zoom processing unit 111 uses the image of the cut area as the zoom image captured with the new zoom magnification.

If the zoom control is performed in Step S368, then, the processing proceeds to Step S370.

On the other hand, in the case where it is determined that the manual operation is performed in Step S367, the zoom control unit 42 controls zoom according to the user's manual operation, i.e., in accordance with the signal supplied from the operation unit 32 in Step S369.

If the zoom control is performed according to the user's operation in Step S369, then, the processing proceeds to S370.

When the zoom control is performed in Step S368 or Step S369, the processing of Step S370 is performed to finish the image capturing processing. Because the processing of Step S370 is the same as that of Step S300 in FIG. 22, a description thereof will be omitted.

As described above, the image capturing apparatus 11 determines the user's operation state based on the angular velocities at the plurality of times, and performs zoom control based on the operation state. Accordingly, it is possible to identify the operation state in more detail and to perform appropriate zoom control. In addition, it is possible to obtain a good-looking image including the subject expected to attract attention of the user, by cutting the area depending on the result of object recognition to produce the zoom-processed image.

<Illustration for Zoom Position Determining Processing>

Figure 25:
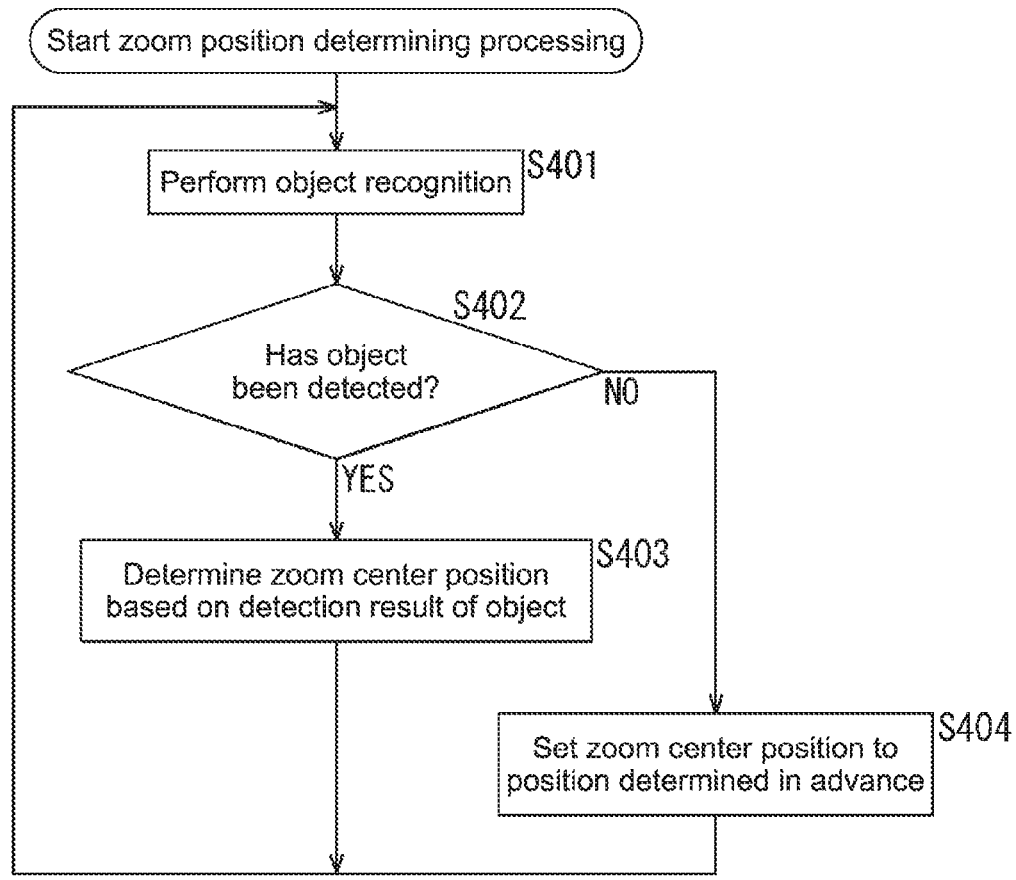
FIG. 25 A flow chart for illustrating zoom position determination processing.

In addition, the image capturing apparatus 11 shown in FIG. 21 performs zoom position determining processing in which object recognition is performed to define the position of the area cut by the zoom processing depending on the recognition result as well as the zoom state determining processing described with reference to FIG. 11. In the following, the zoom position determining processing performed by the image capturing apparatus 11 will be described with reference to the flow chart of FIG. 25.

Figure 23:
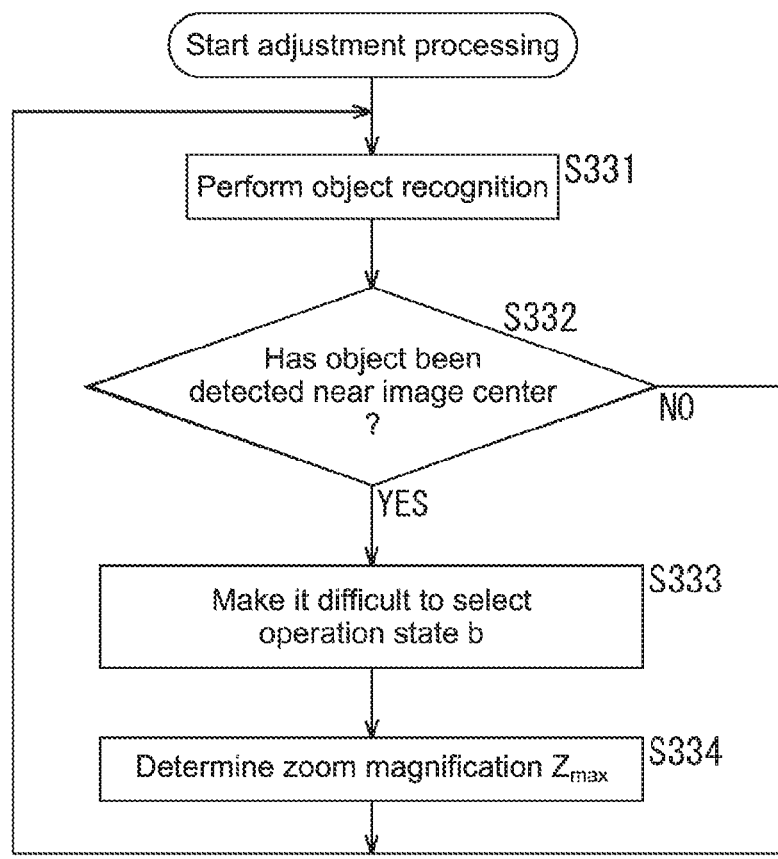
FIG. 23 A flow chart for illustrating adjustment processing.

In Step S401, the object detection unit 141 performs object recognition processing on the image supplied from the A/D converter 24 to detect an object from the image. It should be noted that in Step S401, the same processing as that of Step S331 in FIG. 23 is performed.

In Step S402, the zoom control unit 42 determines whether or not the object is detected from the image.

In the case where the object is detected in Step S402, the zoom control unit 42 determines the zoom center position based on the detection result of the object in Step S403. For example, the zoom control unit 42 sets the position of the detected object on the image to the central position of the area cut by the zoom processing. Accordingly, the area having the detected object at the center is cut as the zoom image. The central position of the cut position of the image determined in this way is used in the processing of Step S368 in FIG. 24.

If the processing of Step S403 is performed, then, the processing returns to Step S401 and the above-mentioned processing is repeatedly performed.

In contrast, in the case where it is determined that the object is not detected in Step S402, the zoom control unit 42 uses the position determined in advance as the zoom center position in Step S404. For example, the zoom control unit 42 uses the central position of the image as the central position of the area cut by the zoom processing. Accordingly, the area near the center of the captured image is cut as the zoom image.

If the processing of Step S404 is performed, then, the processing returns to Step S401 and the above-mentioned processing is repeatedly performed. Then, when the zoom state determining processing in FIG. 11 is finished, the zoom position determining processing is also finished.

As described above, the image capturing apparatus 11 detects an object from the image, and adjust the position of the area on the image cut by the zoom processing depending on the position of the object if the object is detected. Accordingly, it is possible to obtain a good-looking image having the subject at the center.

Ninth Embodiment

<Configuration Example of Image Capturing Apparatus>

Figure 26:
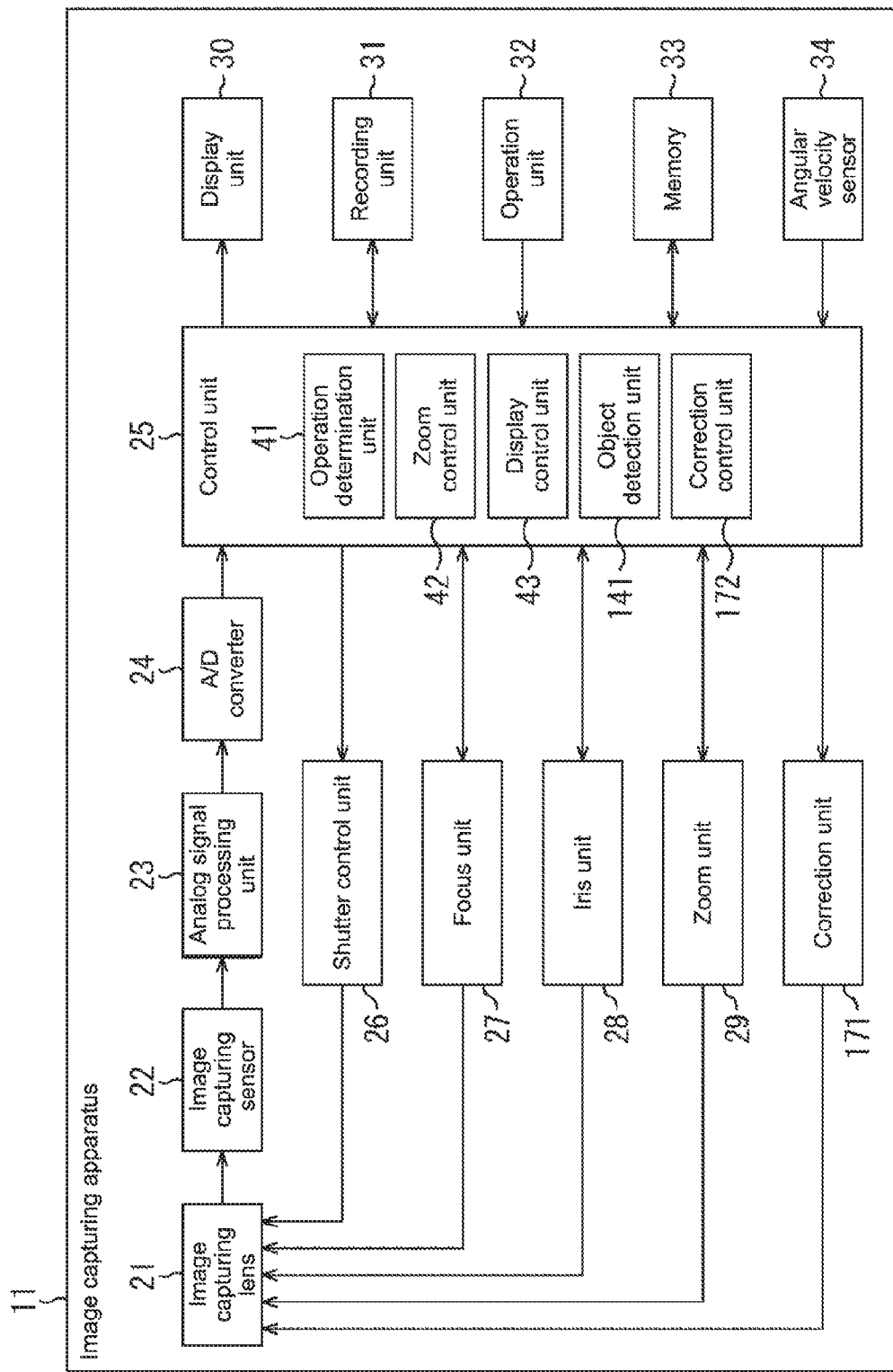
FIG. 26 A diagram showing a configuration example of an image capturing apparatus.

In addition, in the eighth embodiment, an example in which the zoom processing is performed so that the subject is located at the image center in the case where the digital zoom processing is performed has been described. However, also in the case where the optical zoom processing is performed, the subject may be located at the image center. In such a case, the image capturing apparatus 11 is configured as shown in FIG. 26, for example. It should be noted that in FIG. 26, the same components as those in FIG. 1 or FIG. 21 will be denoted by the same reference symbols and a description thereof will be omitted appropriately.

The image capturing apparatus 11 shown in FIG. 26 has a configuration obtained by adding a correction unit 171 to the image capturing apparatus 11 shown in FIG. 1 and the object detection unit 141 and a correction control unit 172 to the control unit 25.

The correction unit 171 adjusts the direction captured by the image capturing apparatus 11, by inclining a part or whole of the lens forming the image capturing lens 21 under the control of the correction control unit 172. For example, the lens inclined by the correction unit 171 is, for example, an image stabilizing lens. It should be noted that in the following description, the image capturing lens 21 itself is inclined with respect to the image capturing sensor 22.

The object detection unit 141 performs the object recognition processing on the image supplied from the A/D converter 24 to detect an object from the image. The correction control unit 172 obtains the inclined angle of the image capturing lens 21 depending on the recognition result of the object by the object detection unit 141, and controls the correction unit 171 based on the inclined angle.

<Illustration for Image Capturing Processing>

Next, the operation of the image capturing apparatus 11 shown in FIG. 26 will be described.

In the following, the image capturing processing performed by the image capturing apparatus 11 shown in FIG. 26 will be described with reference to the flow chart of FIG. 27. It should be noted that the processing of Step S431 to Step S438 is the same as that of Step S11 to Step S18 in FIG. 7, a description thereof will be omitted.

Figure 27:
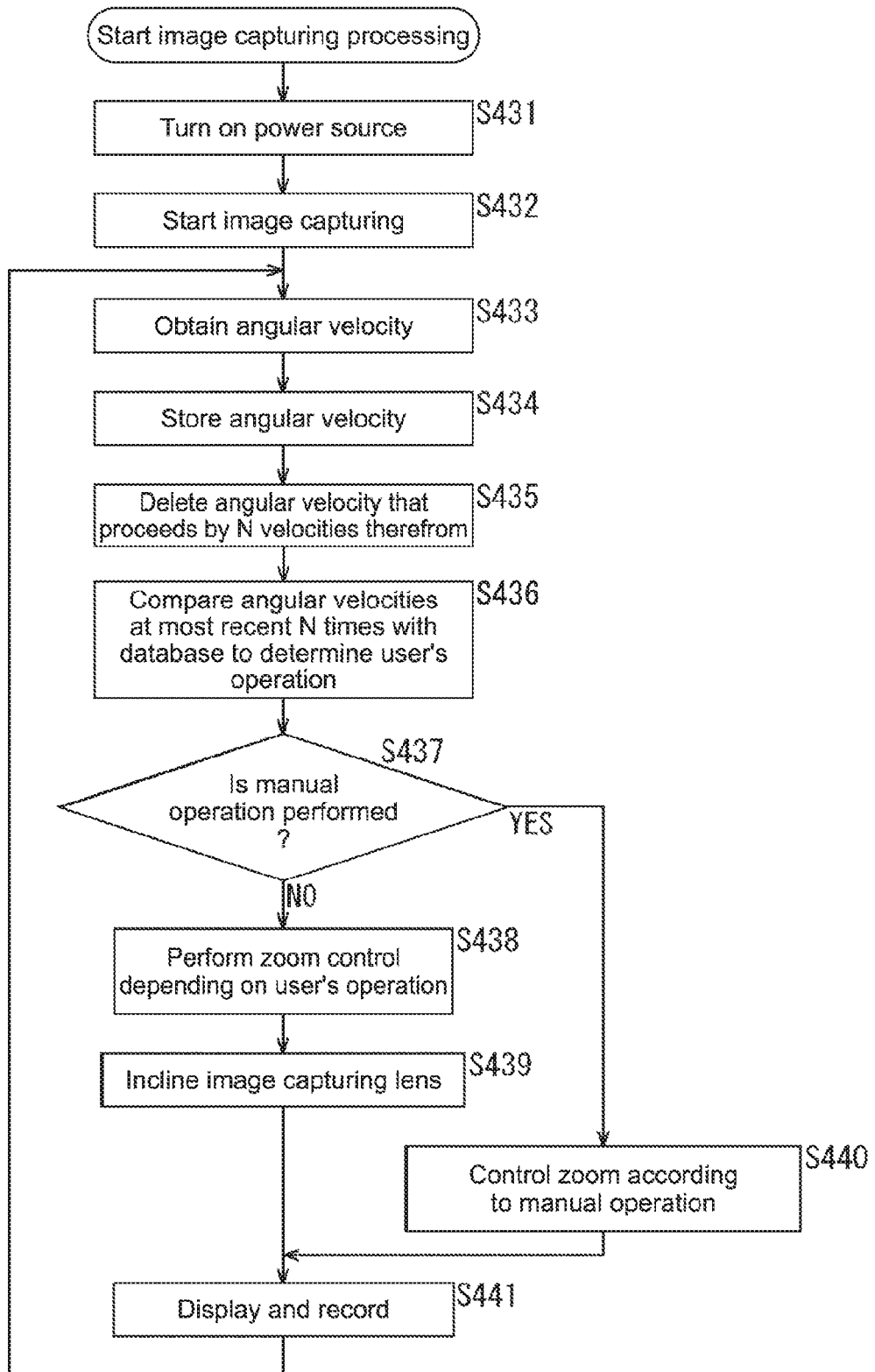
FIG. 27 A flow chart for illustrating image capturing processing.

It should be noted that in the case where the image capturing processing of FIG. 27 is performed as will be described later, processing to perform object recognition to obtain the inclined angle of the image capturing lens 21 so that the object falls within the image depending on the recognition result as well as the zoom state determining processing described with reference to FIG. 11 are performed.

In Step S439, the correction unit 171 inclines the image capturing lens 21 under the control of the correction control unit 172.

In the case where an object is detected from the image, the correction control unit 172 obtains the inclined angle of the image capturing lens 21 so that the detected object is located at the image center as will be described. Then, the correction control unit 172 controls driving of the correction unit 171 so that an angle between the optical lens of the image capturing lens 21 and the normal line of the receiving surface of the image capturing sensor 22 is the obtained inclined angle to incline the image capturing lens 21. The correction unit 171 inclines the image capturing lens 21 under the control of the correction control unit 172.

Accordingly, the object detected from the image is located at the image center, and it is possible to obtain a good-looking image. It should be noted that in the case where an object is not detected from the image, the processing to incline the image capturing lens 21 is not performed.

If the processing of Step S439 is performed, then, the processing proceeds to Step S441.

On the other hand, in the case where it is determined that the manual operation is performed in Step S437, the zoom control unit 42 control the zoom unit 29 according to the user's manual operation to change the zoom magnification of the image capturing lens 21 in Step S440.

If the zoom control is performed according to the user's operation in Step S440, then, the processing proceeds to Step S441.

If the processing of Step S439 or Step S440 is performed, then, the processing of Step S441 is performed to finish the image capturing processing. Because the processing of Step S441 is the same as that of Step S20 in FIG. 7, a description thereof will be omitted.

As described above, the image capturing apparatus 11 identifies the user's operation state based on the angular velocities at the plurality of times, and performs zoom control depending on the identified operation state. Accordingly, it is possible to identify the operation state in more detail and to perform appropriate zoom control. In addition, by inclining the image capturing lens 21 depending on the result of object recognition, it is possible to obtain a good-looking image including the subject expected to attract attention of the user.

<Illustration for Inclined Angle Determining Processing>

Figure 28:
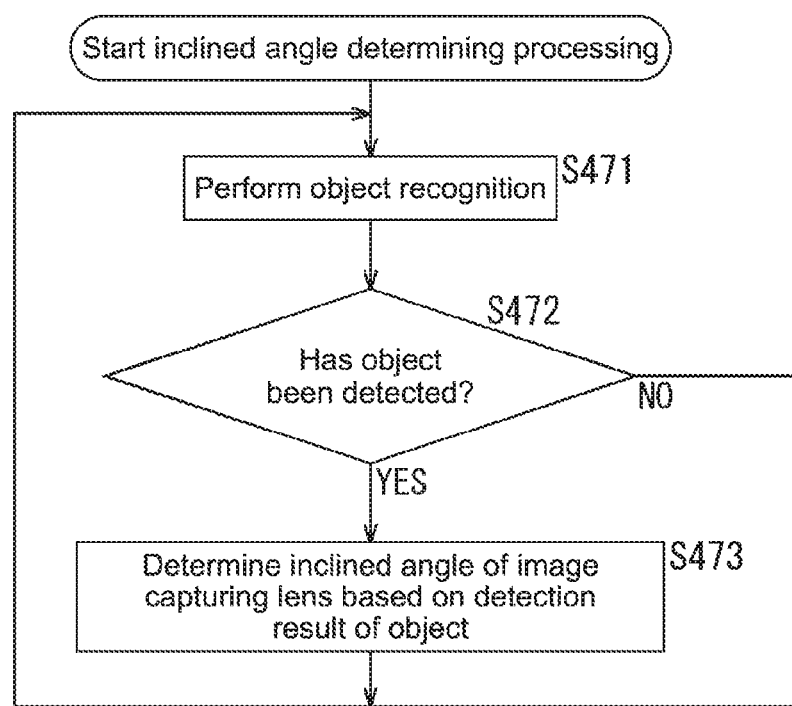
FIG. 28 A flow chart for illustrating inclined angle determination processing.

In addition, the image capturing apparatus 11 shown in FIG. 26 performs inclined angle determining processing to perform object recognition to obtain the inclined angle of the image capturing lens 21 depending on the recognition result so that the object falls within the image as well as the zoom state determining processing described with reference to FIG. 11. In the following, the inclined angle determining processing performed by the image capturing apparatus 11 will be described with reference to the flow chart of FIG. 28.

In Step S471, the object detection unit 141 performs the object recognition processing on the image supplied from the A/D converter 24 to detect an object from the image. It should be noted that in Step S471, the same processing as that of Step S331 of FIG. 23 is performed.

In Step S472, the correction control unit 172 determines whether or not the object is detected from the image.

In the case where it is determined that the object is not detected in Step S472, the processing returns to Step S471 and the above-mentioned processing is repeatedly performed. Specifically, in the case where the object is not detected, the inclined angle of the image capturing lens 21 is 0 and thus the image capturing lens 21 is not inclined.

In contrast, in the case where it is determined that the object is detected in Step S472, the correction control unit 172 obtains the inclined angle of the image capturing lens 21 based on the position of the object on the image so that the detected object is located at the image center in Step S473. Then, the correction control unit 172 controls driving of the correction unit 171 based on the obtained inclined angle. Accordingly, the object detected from the image is located at the image center, and it is possible to obtain a good-looking image.

If the processing of Step S473 is performed, then, the processing returns to Step S471 and the above-mentioned processing is repeatedly performed. Then, when the zoom state determining processing in FIG. 11 is finished, the inclined angle determining processing is also finished.

As described above, the image capturing apparatus 11 detects an object from the image and obtains the inclined angle of the image capturing lens 21 depending on the position of the object if the object is detected. Accordingly, it is possible to obtain a good-looking image having the subject at the center.

It should be noted that in this embodiment, an example in which the position of the object on the image is adjusted by inclining the image capturing lens 21 has been described. However, it may be possible to adjust the position of the object on the image by inclining the image capturing lens 21 and adjusting the position at which the area including the object on the image is cut.

Incidentally, the series of processing described above may be performed by hardware or software. For the software to perform the series of processing, a program in the software is installed on a computer. Herein, the computer includes a computer in hardware specifically designed therefor, or a general-purpose personal computer that may perform various functions by installation of various programs, for example.

Figure 29:
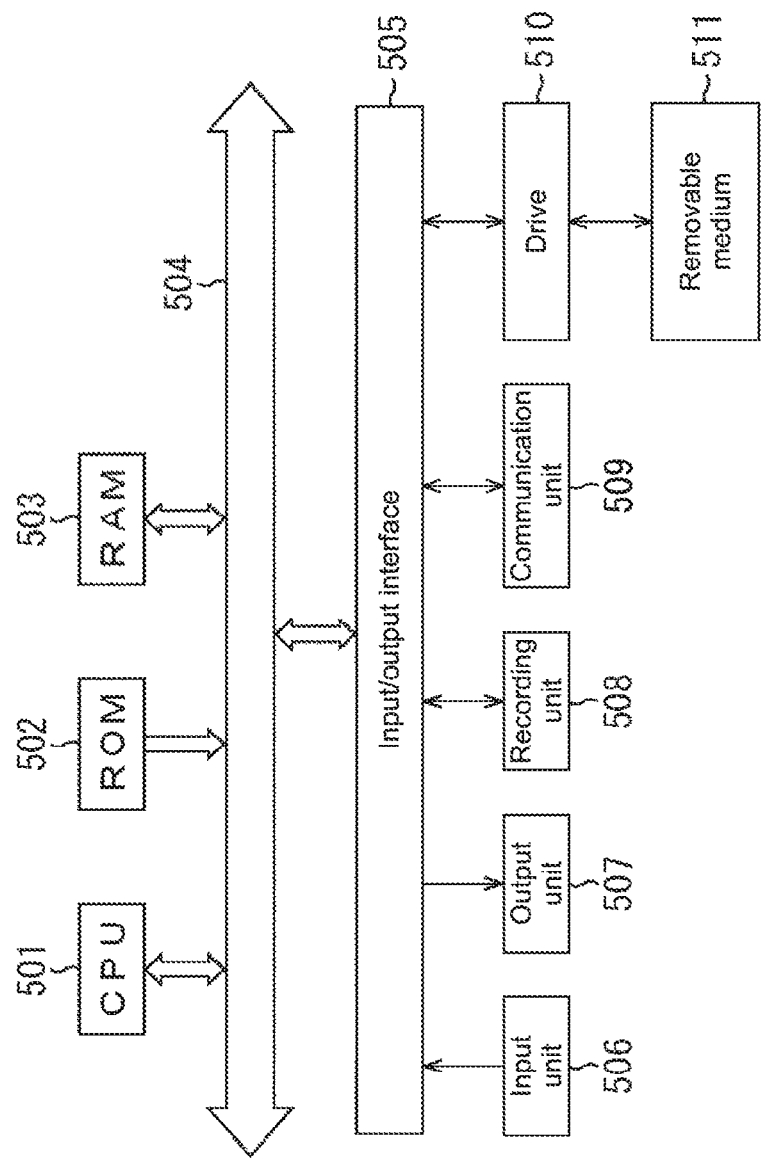
FIG. 29 A diagram showing a configuration example of a computer.

FIG. 29 is a block diagram showing a configuration example of hardware of a computer that executes the series of processing described above by a program.

In the computer, a CPU 501, a ROM 502, and a RAM 503 are connected to each other by a bus 504.

To the bus 504, an input/output interface 505 is connected. To the input/output interface 505, an input unit 506, an output unit 507, a recording unit 508, a communication unit 509, and a drive 510 are connected.

The input unit 506 is made of a keyboard, mouse, microphone, image capturing sensor, or the like. The output unit 507 is made of a display, speaker, or the like. The recording unit 508 is made of a hard disc, non-volatile memory, or the like. The communication unit 509 is made of a network interface, or the like. The drive 510 drives a removable medium 511 such as a magnetic disc, an optical disc, a magneto-optical disc, and a semiconductor memory.

In the computer configured as described above, the CPU 501 loads a program stored in the recording unit 508 in the RAM 503 via the input/output interface 505 and the bus 504 and executes it to perform the series of processing described above, for example.

The program executed by the computer (CPU 501) can be recorded onto the removable medium 511 as a package medium, for example, and provided. Moreover, the program can be provided via a wired or wireless transmission medium such as a local area network, the Internet, and digital satellite broadcast.

In the computer, by loading the removable medium 511 in the drive 510, the program can be installed in the recording unit 508 via the input/output interface 505. The program can also be received by the communication unit 509 via a wired or wireless transmission medium and installed in the recording unit 508. Alternatively, the program can be installed in advance in the ROM 502 or the recording unit 508.

It should be noted that the program to be executed by the computer may be a program in which processing are performed in time series in the order described in the specification or a program in which processing are performed in parallel or at necessary timings when invoked, for example.

It should be noted that the embodiment of the present technology is not limited to the embodiment described above and can be variously modified without departing from the gist of the present technology.

For example, the present technology can take a cloud computing configuration in which one function is shared and processed cooperatively by a plurality of apparatuses via a network.

Moreover, the steps described in the flowcharts can be assigned to and executed by a plurality of apparatuses instead of executing them by a single apparatus.

Furthermore, when a single step includes a plurality of processing, the plurality of processing included in the single step can be assigned to and executed by a plurality of apparatuses instead of executing them by a single apparatus.

Effects described in the specification are given for illustrative purposes only and not necessarily limited, and may be any other effects.

It should be noted that the present technology may also take the following configurations.

(1) An image capturing apparatus including:

an angular velocity detection unit configured to detect an angular velocity of movement of its own;

an operation determination unit configured to determine an operation state of a user based on the angular velocity at a plurality of times; and a zoom control unit configured to perform zoom control based on the operation state.

(2) The image capturing apparatus according to (1), in which the zoom control unit performs the zoom control so that a zoom magnification is decreased in a case of the operation state in which the angular velocity increases with time.

(3) The image capturing apparatus according to (1) or (2), in which the zoom control unit performs the zoom control so that a zoom magnification is increased in a case of the operation state in which the angular velocity decreases with time.

(4) The image capturing apparatus according to any one of (1) to (3), in which the zoom control unit performs the zoom control so that a zoom magnification remains constant if the operation state is changed from the state where the angular velocity decreases with time to the state where the angular velocity increases with time.

(5) The image capturing apparatus according to any one of (1) to (4), in which the zoom control unit makes it difficult for the operation determination unit to determine the operation state as a predetermined operation state in a case where specific zoom control is performed.

(6) The image capturing apparatus according to any one of (1) to (5), in which the operation determination unit obtains a relation equation of the time and the angular velocity based on the angular velocities at the plurality of times and compares a coefficient of the obtained relation equation with a range of values that a coefficient of a relation equation determined in advance for each of a plurality of operation states can have, thereby determining the operation state.

(7) The image capturing apparatus according to any one of (1) to (5), in which the operation determination unit determines the operation state by obtaining a distance between the angular velocities at the plurality of times and angular velocities at a plurality of times determined in advance for each of a plurality of operation states.

(8) The image capturing apparatus according to any one of (1) to (5), in which the operation determination unit estimates an angular velocity at a future time based on the angular velocities at the plurality of times, and determines the operation state based on the angular velocity obtained by the estimation and the angular velocities at the plurality of times.

(9) The image capturing apparatus according to any one of (1) to (8), further including a zoom processing unit configured to cut a partial area of a captured image under control of the zoom control unit to generate a zoom image.

(10) The image capturing apparatus according to (9), further including a display control unit configured to arrange the captured image and the zoom image for display.

(11) The image capturing apparatus according to (10), in which the display control unit displays a frame on an area from which the zoom image is cut in the image.

(12) The image capturing apparatus according to (9), further including
a display control unit configured to arrange an image obtained by combining the images captured at the plurality of times and the zoom image for display.
(13) The image capturing apparatus according to (12), in which
the display control unit displays a frame on an area from which the zoom image is cut in the image obtained by the composition.
(14) The image capturing apparatus according to any one of (1) to (9), further including
an object detection unit configured to detect an object from a captured image, the zoom control unit being configured to perform the zoom control so that a state where the object is enlarged is kept in a case where the object is detected near a center of the image.
(15) The image capturing apparatus according to (9), further including
an object detection unit configured to detect an object from the captured image, the zoom control unit being configured to determine a position at which the zoom image is cut from the image based on the detection result of the object.
(16) The image capturing apparatus according to any one of (1) to (8), further including
an object detection unit configured to detect an object from a captured image, and
a correction unit configured to incline a lens that collects light entered from a subject depending on the detection result of the object.
(17) An image capturing method including the steps of:
detecting an angular velocity of movement of an image capturing apparatus;
determining an operation state of a user that operates the image capturing apparatus based on angular velocities at a plurality of times; and
performing zoom control based on the operation state.
(18) A program that causes a computer to execute processing including the steps of:
detecting an angular velocity of movement of an image capturing apparatus;
determining an operation state of a user that operates the image capturing apparatus based on angular velocities at a plurality of times; and
performing zoom control based on the operation state.

DESCRIPTION OF REFERENCE NUMERALS 11 image capturing apparatus
21 image capturing lens
22 image capturing sensor
25 control unit
29 zoom unit
33 memory
34 angular velocity sensor
41 operation determination unit
42 zoom control unit
43 display control unit
111 zoom processing unit
141 object detection unit
172 correction control unit

The invention claimed is:
1. An image capturing apparatus comprising:
an angular velocity detection unit configured to respectively detect angular velocities of movement of the image capturing apparatus at a plurality of times;
an operation determination unit configured to determine a panning operation state of the image capturing apparatus based on the detected angular velocities at the plurality of times, the determined panning operation state being one of a plurality of predetermined classifications of panning operation states; and
a zoom control unit configured to perform zoom control based on the determined panning operation state.
2. The image capturing apparatus according to claim 1, wherein
the zoom control unit performs the zoom control so that a zoom magnification is decreased in a case of the determined panning operation state in which the angular velocity increases with time.
3. The image capturing apparatus according to claim 1, wherein
the zoom control unit performs the zoom control so that a zoom magnification is increased in a case of the determined panning operation state in which the angular velocity decreases with time.
4. The image capturing apparatus according to claim 1, wherein
the zoom control unit performs the zoom control so that a zoom magnification remains constant if the determined panning operation state is changed from the state where the angular velocity decreases with time to the state where the angular velocity increases with time.
5. The image capturing apparatus according to claim 1, wherein
the zoom control unit inhibits the operation determination unit from determining the operation state as one of the predetermined classifications of panning operation stated in a case where specific zoom control is performed.
6. The image capturing apparatus according to claim 1, wherein
the operation determination unit obtains a relation equation of time and angular velocity based on the angular velocities at the plurality of times and compares a coefficient of the obtained relation equation with a range of values for a coefficient of a predetermined relation equation for each the plurality of classifications of panning operation states.
7. The image capturing apparatus according to claim 1, wherein
the operation determination unit determines the operation state by obtaining a distance between the angular velocities at the plurality of times and angular velocities at a plurality of times determined in advance for each of the plurality of classifications of panning operation states.
8. The image capturing apparatus according to claim 1, further comprising
a zoom processing unit configured to cut a partial area of a captured image under control of the zoom control unit to generate a zoom image.
9. The image capturing apparatus according to claim 8, further comprising
a display control unit configured to arrange the captured image and the zoom image for display.
10. The image capturing apparatus according to claim 9, wherein
the display control unit displays a frame on an area from which the zoom image is cut in the image.
11. The image capturing apparatus according to claim 8, further comprising a display control unit configured to arrange an image obtained by combining the images captured at the plurality of times and the zoom image for display.

12. The image capturing apparatus according to claim 11, in which
the display control unit displays a frame on an area from which the zoom image is cut in the image obtained by the composition.

13. The image capturing apparatus according to claim 1, further comprising
an object detection unit configured to detect an object from a captured image, the zoom control unit being configured to perform the zoom control so that a state where the object is enlarged is kept in a case where the object is detected near a center of the image.

14. The image capturing apparatus according to claim 8, further comprising
an object detection unit configured to detect an object from the captured image, the zoom control unit being configured to determine a position at which the zoom image is cut from the image based on the detection result of the object.

15. The image capturing apparatus according to claim 1, further comprising
an object detection unit configured to detect an object from a captured image, and
a correction unit configured to incline a lens that collects light entered from a subject depending on the detection result of the object.

16. An image capturing method comprising:
detecting angular velocities of movement of an image capturing apparatus, respectively, at a plurality of times;
determining a panning operation state of the image capturing apparatus based on the detected angular velocities at the plurality of times, the determined panning operation state being one of a plurality of predetermined classifications of panning operation states; and
performing zoom control based on the determined panning operation state.

17. A non-transitory computer readable medium storing program code executable by a computer to perform operations comprising:
detecting angular velocities of movement of an image capturing apparatus, respectively, at a plurality of times;
determining a panning operation state of the image capturing apparatus based on the detected angular velocities at the plurality of times, the determined panning operation state being one of a plurality of predetermined classifications of panning operation states; and
performing zoom control based on the determined panning operation state.

18. The image capturing apparatus according to claim 1, wherein the operation determination unit estimates an additional angular velocity corresponding to a future time based on the detected angular velocities, and determines the panning operation state based on the estimated additional angular velocity and the detected angular velocities.

19. The image capturing apparatus according to claim 1, wherein performing the zoom control further comprises controlling a rate of change of zoom magnification in dependence upon the determined panning operation state.

20. The image capturing apparatus according to claim 19, wherein controlling the rate of change of the zoom magnification comprises causing the rate of change to be directly proportional to a rate of change of the panning operation.

* * * * *